United States Patent [19]

Erickson et al.

[11] Patent Number: 4,769,127
[45] Date of Patent: Sep. 6, 1988

[54] COMPUTERIZED MONORAIL CATALYST HANDLING PROCESS AND SYSTEM FOR RESID HYDROTREATING UNITS

[75] Inventors: Michael E. Erickson, Country Club Hills; Roman T. Plichta, Naperville, both of Ill.

[73] Assignee: Amoco Corporation, Chicago, Ill.

[21] Appl. No.: 781,932

[22] Filed: Sep. 30, 1985

[51] Int. Cl.⁴ .................. C10G 65/12; B65G 65/23; B65G 63/02; B65G 69/06
[52] U.S. Cl. .................................. 208/58; 208/174; 208/176; 208/370; 220/284; 220/327; 220/334; 406/2; 406/7; 414/274; 414/294; 414/411; 414/444; 414/573; 414/785; 502/29
[58] Field of Search ............... 208/174, 370, 58, 173, 208/175, 176; 406/1, 2, 3, 4, 6, 7; 414/274, 294, 411, 444, 560, 573, 591, 785, 786; 220/284, 327, 334

[56] References Cited

U.S. PATENT DOCUMENTS

| | | | |
|---|---|---|---|
| 2,847,364 | 8/1958 | Hirsch | 406/93 X |
| 3,483,829 | 12/1969 | Barry | 104/18 |
| 3,679,563 | 7/1972 | Pollock | 208/166 |
| 3,773,653 | 11/1973 | Nongbri et al. | 208/50 |
| 3,893,911 | 7/1975 | Rovesti et al. | 208/251 H |
| 3,918,585 | 11/1975 | Hagelstam | 209/3 |
| 3,948,764 | 4/1976 | Edwards | 209/30 |
| 4,059,194 | 11/1977 | Barry | 414/391 X |
| 4,082,042 | 4/1978 | Barry | 104/18 |
| 4,360,304 | 11/1982 | Brewer et al. | 414/191 |
| 4,482,285 | 11/1984 | Copie | 414/589 |

Primary Examiner—Olik Chaudhuri
Attorney, Agent, or Firm—Thomas W. Tolpin; William H. Magidson; Ralph C. Medhurst

[57] ABSTRACT

An improved catalyst handling process and system is provided to safely, effectively, and automatically transport catalyst by remote control to and from resid hydrotreating units. The process and equipment feature computerized monorail equipment for efficiently transporting special fresh catalyst containers and spent catalyst containers. Various electronic equipment is provided to electronically detect the type of catalyst stored in the catalyst containers. Lift elevators, four-prong liftfork trucks, remote control tilting mechanisms, catalyst transfer lines, deoiler units, bridge cranes, and other transport vehicles, as described, can also be used.

8 Claims, 13 Drawing Sheets

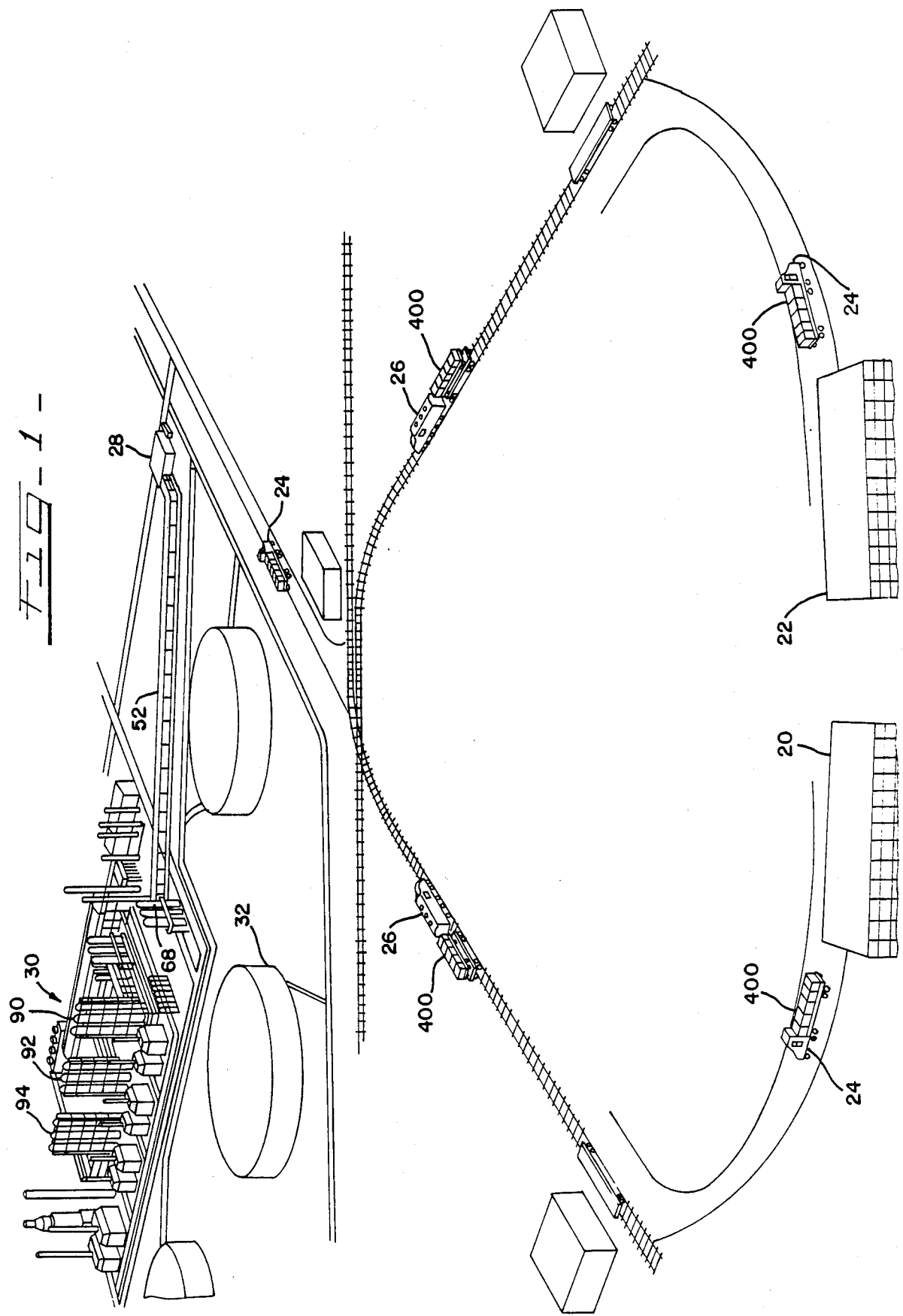

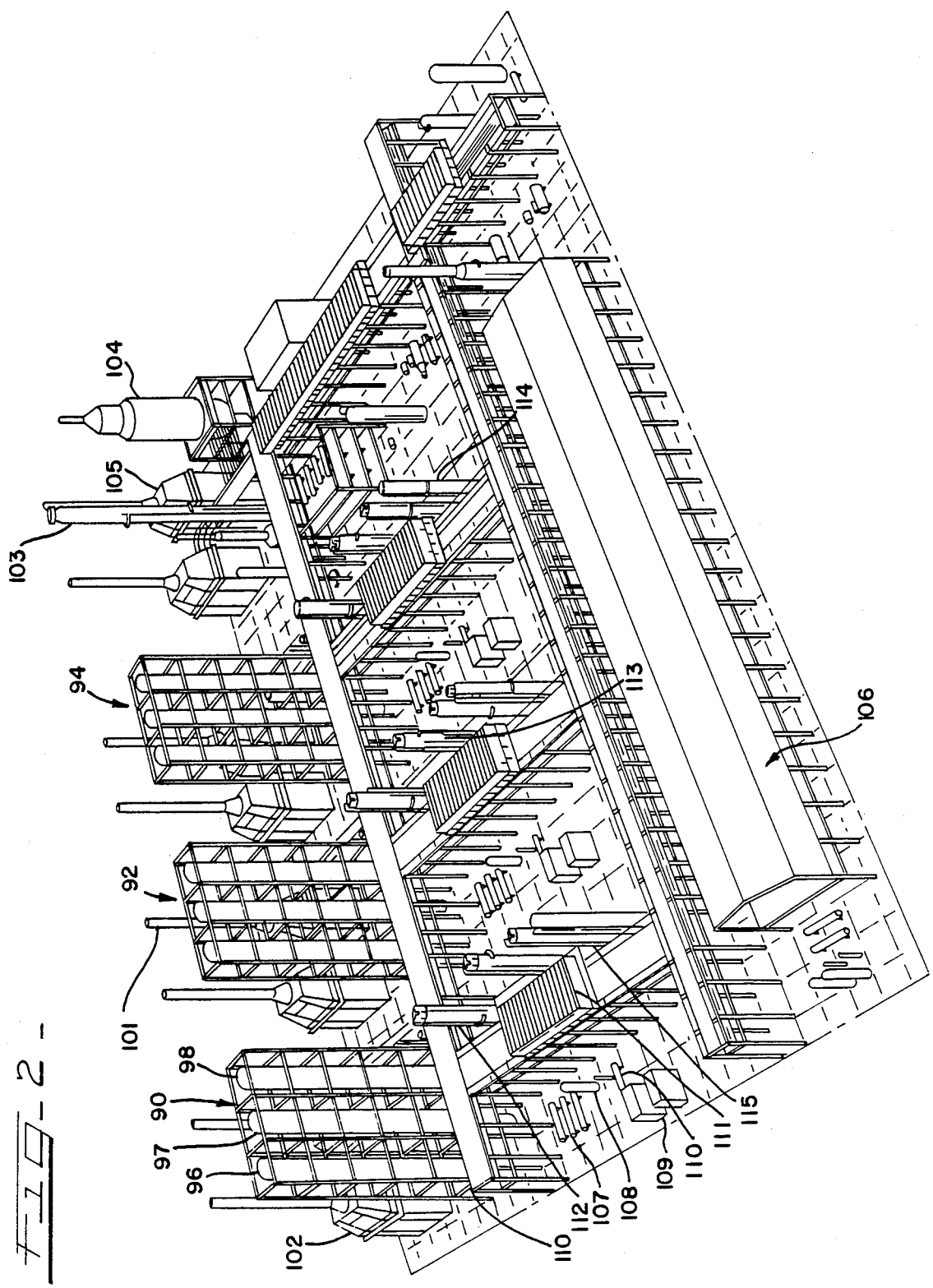

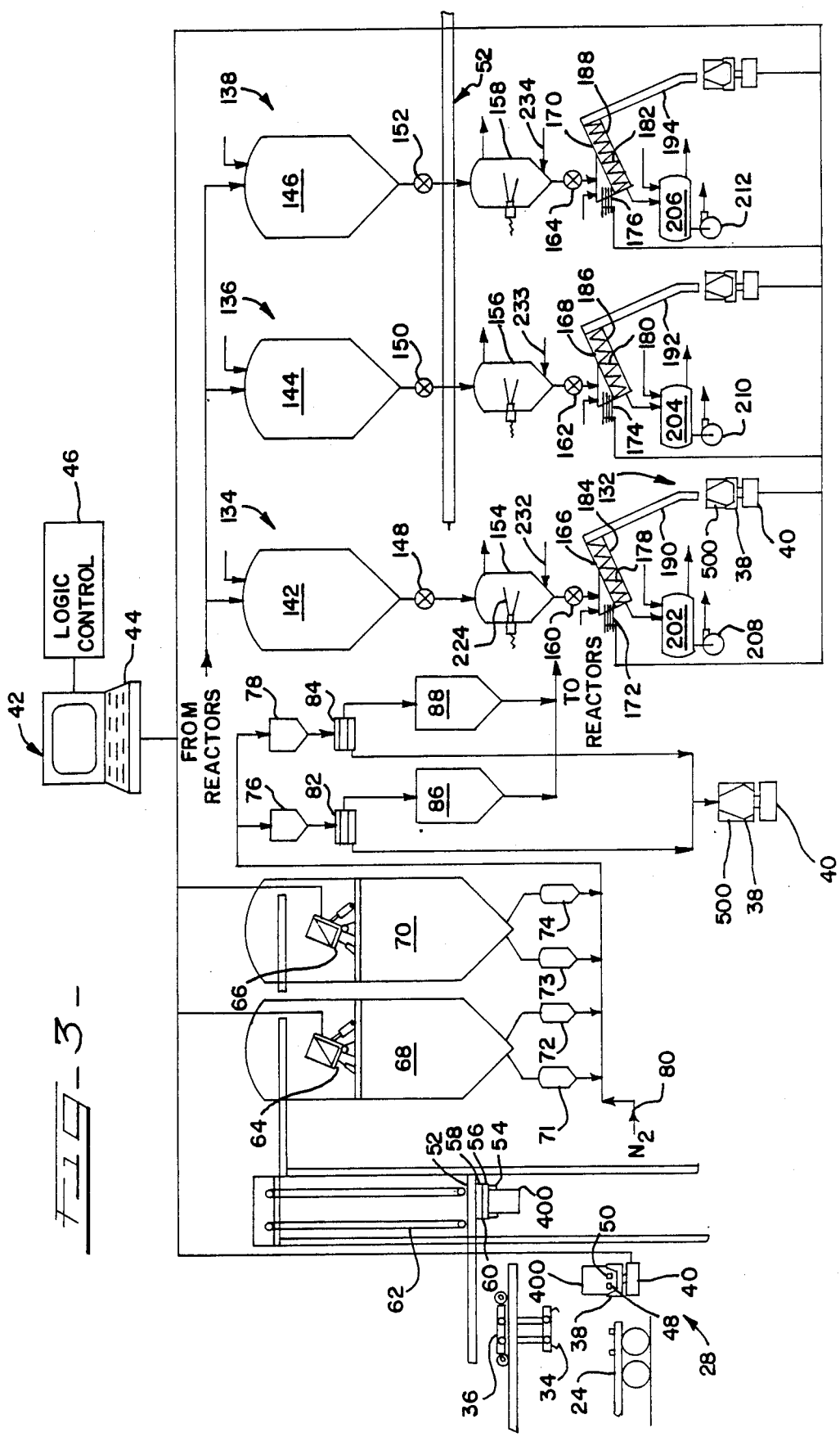

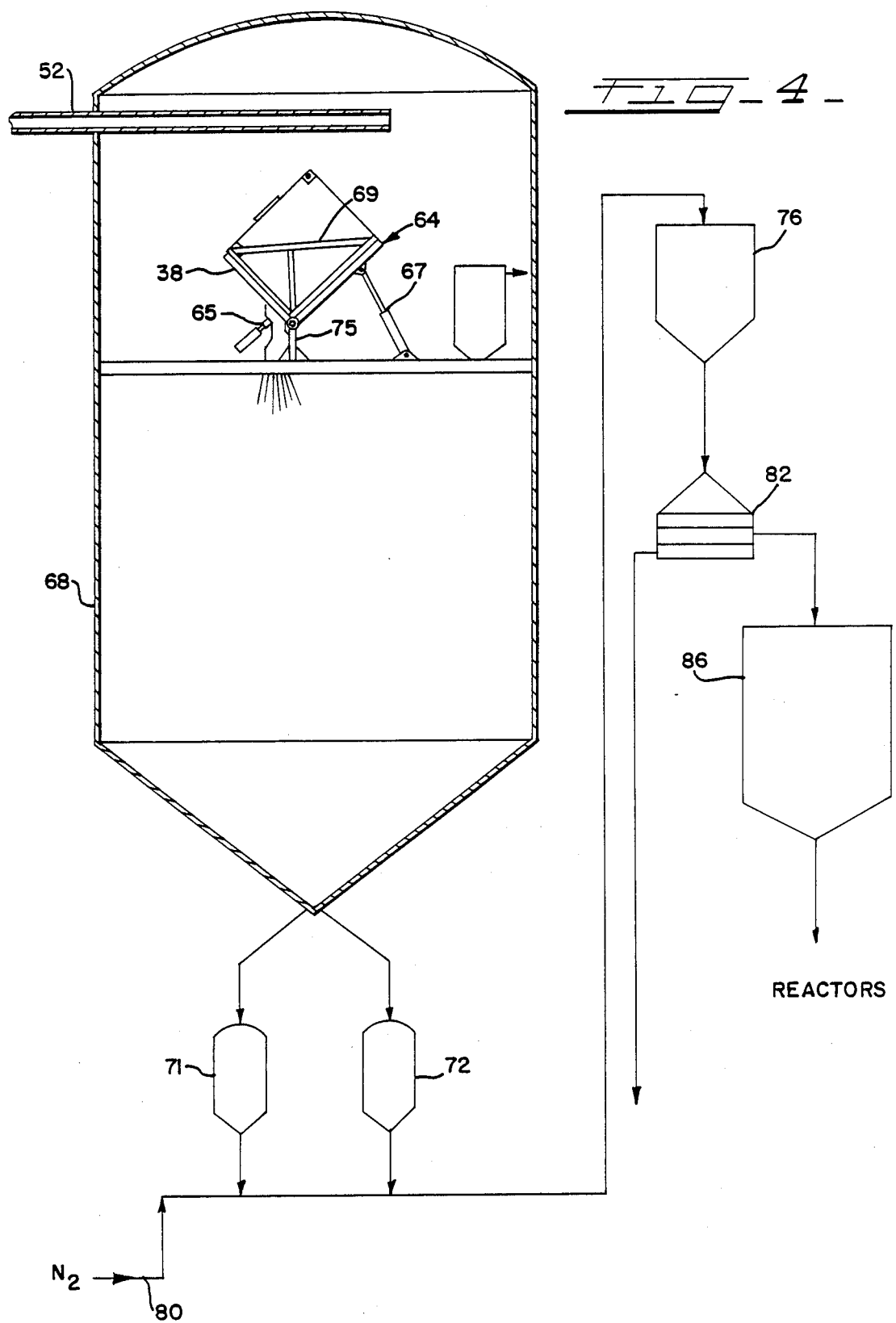

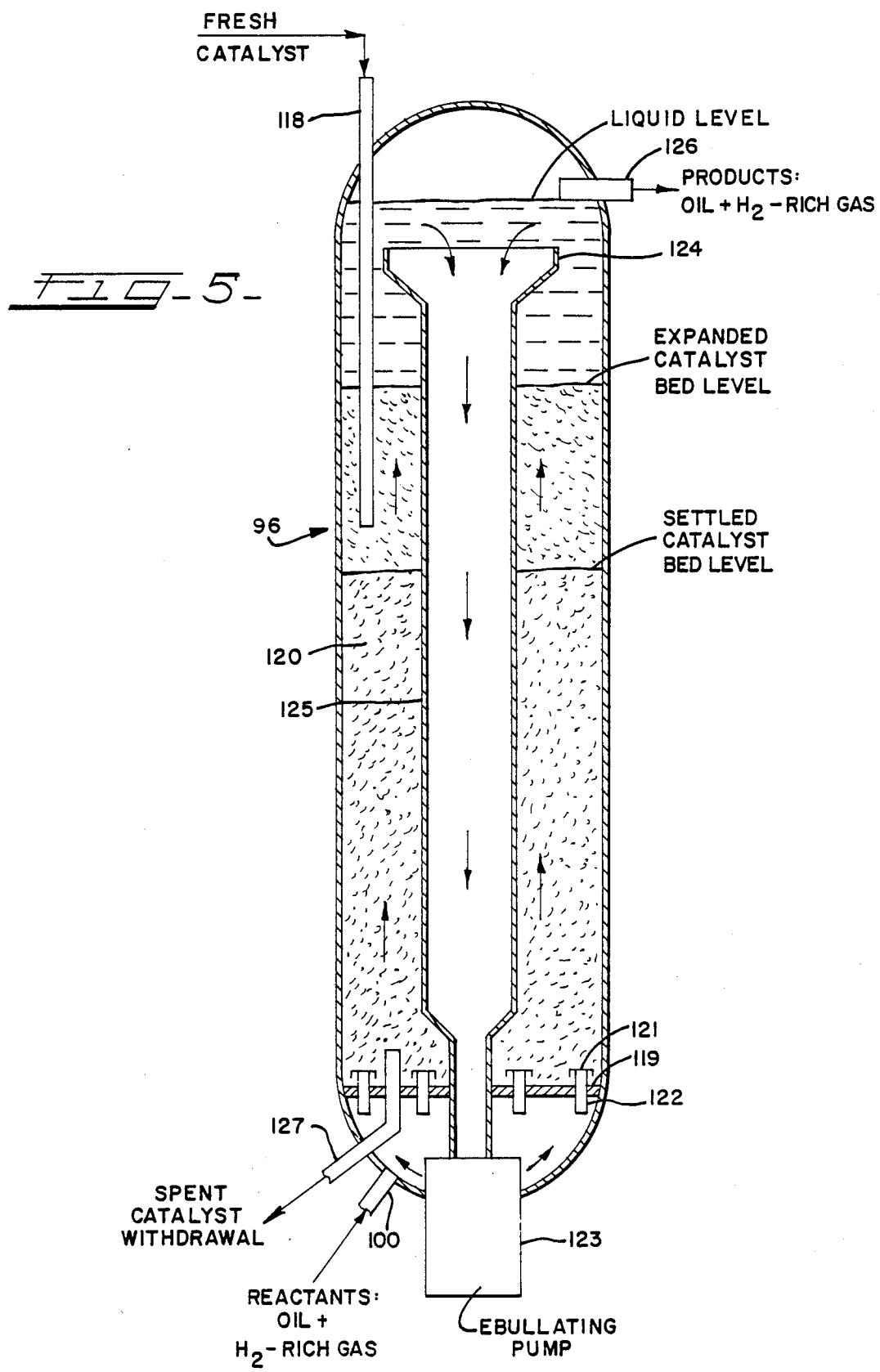

FIG.- 6 -
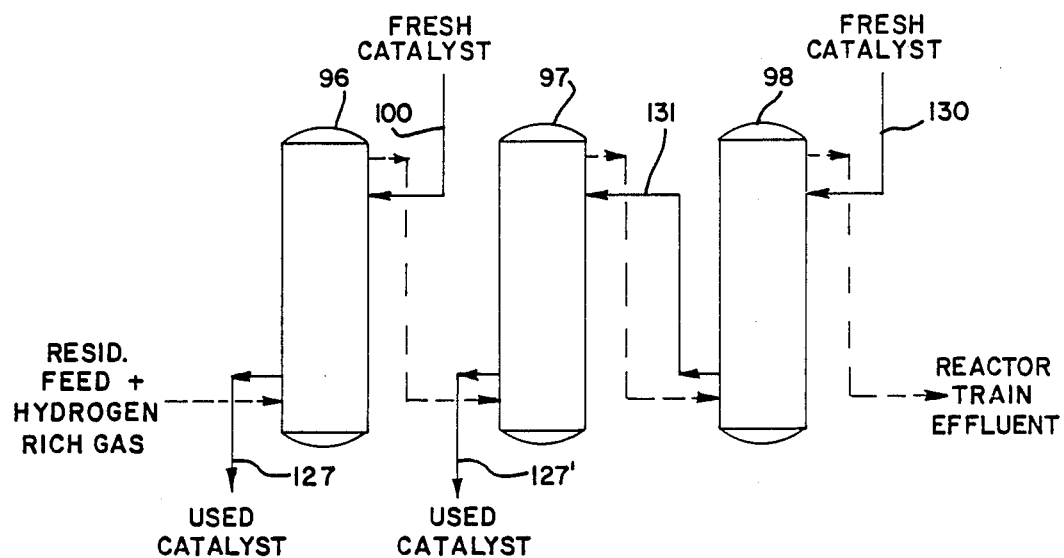
FIG.- 7 -
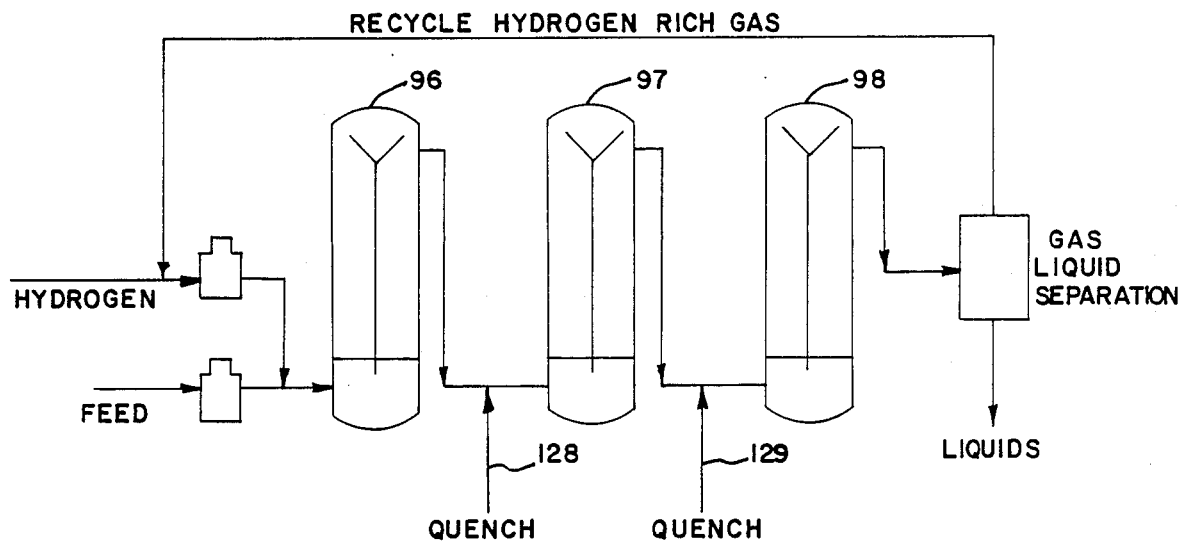

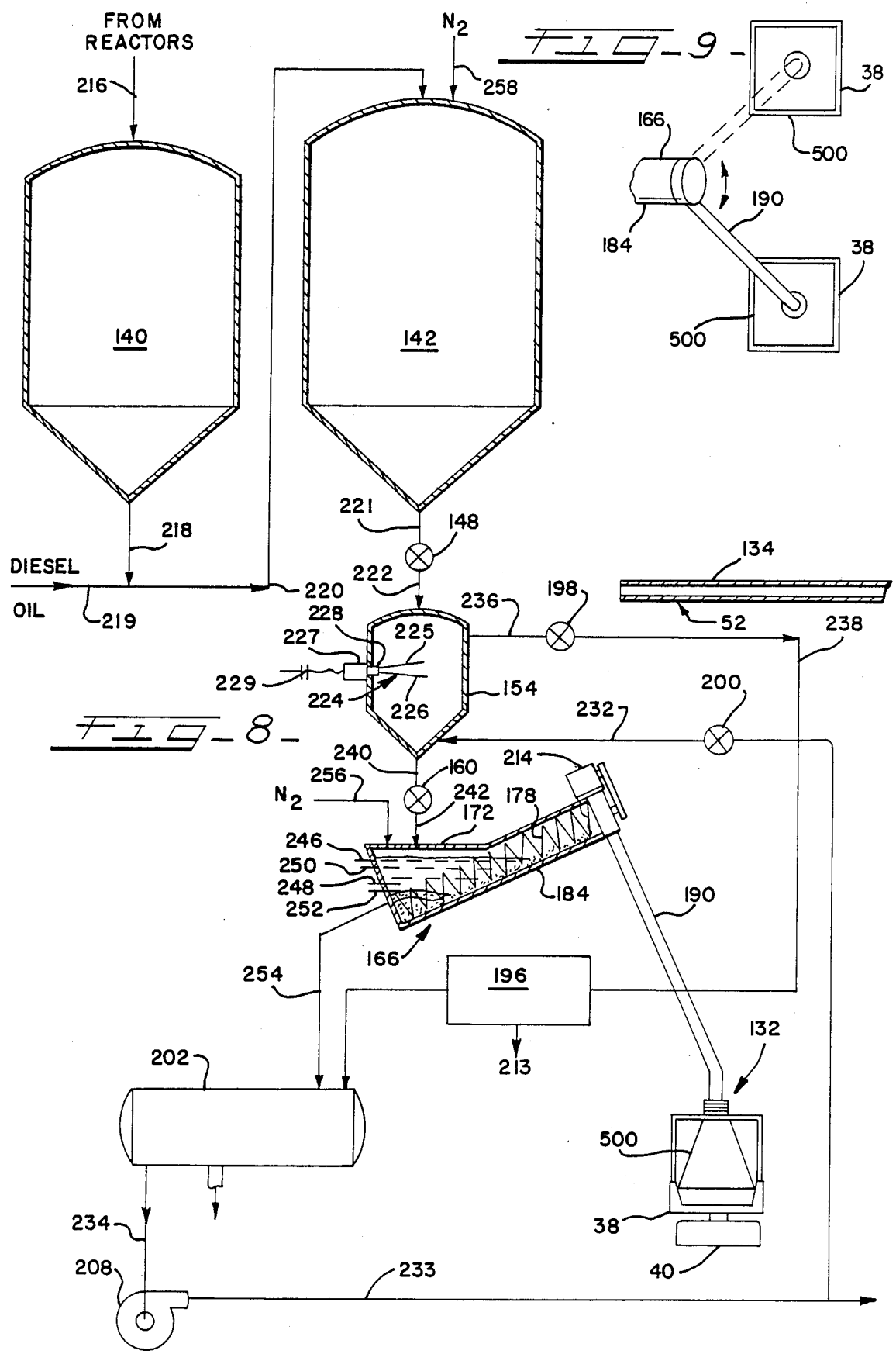

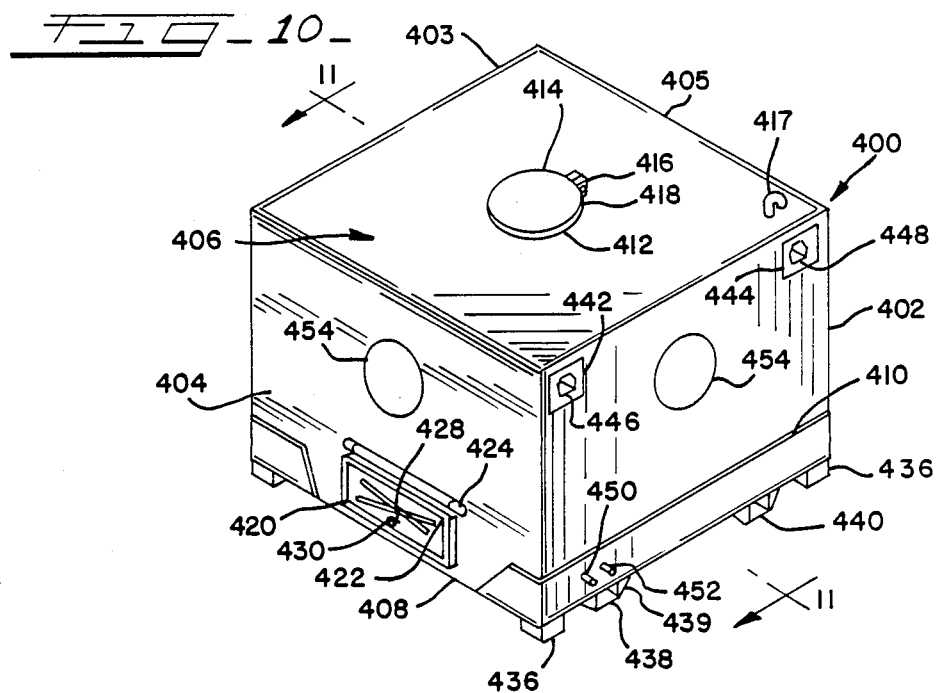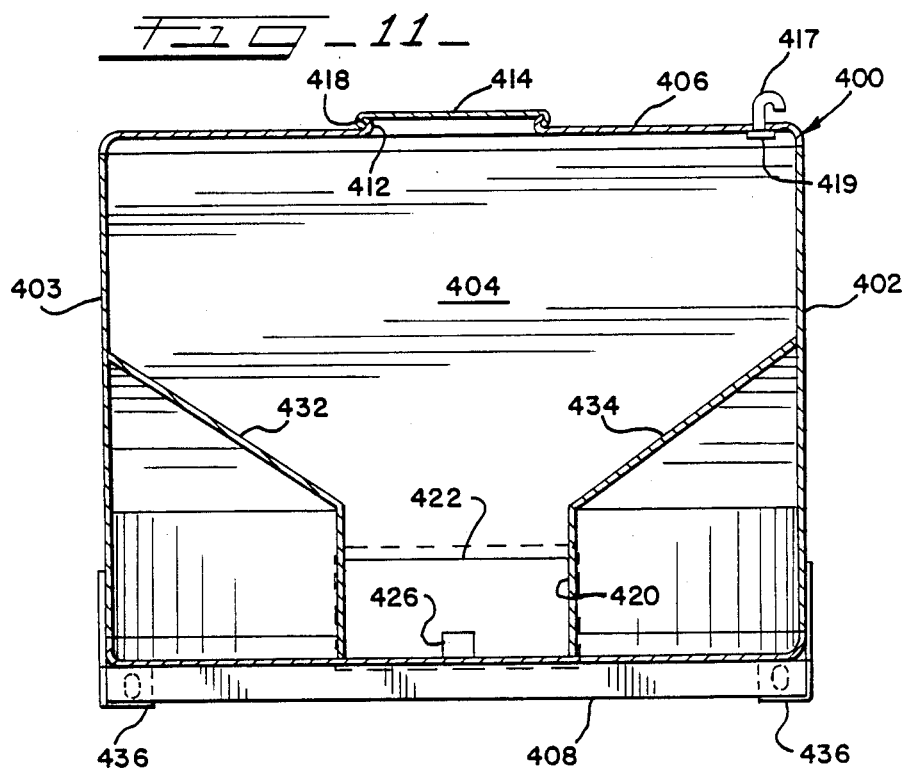

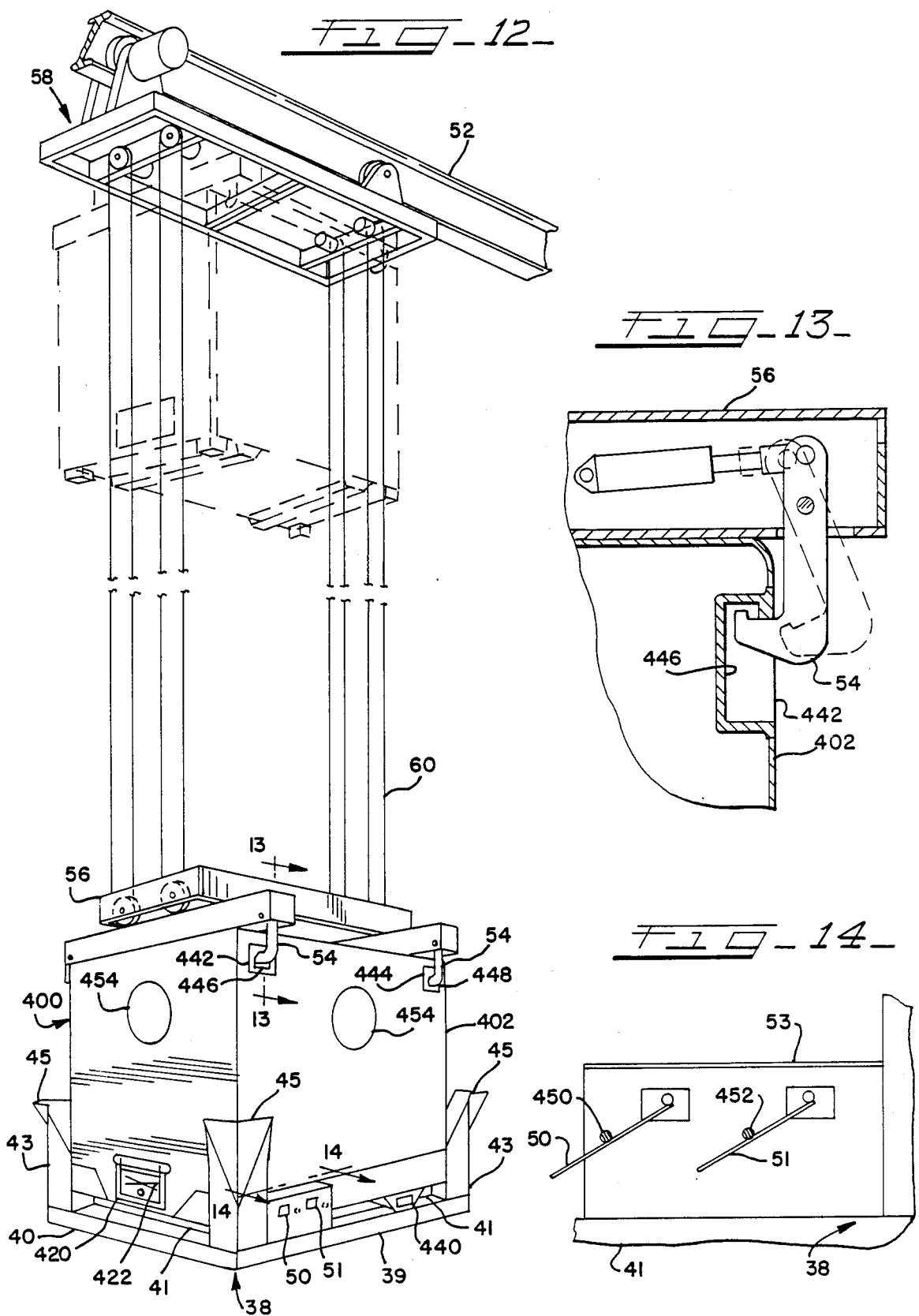

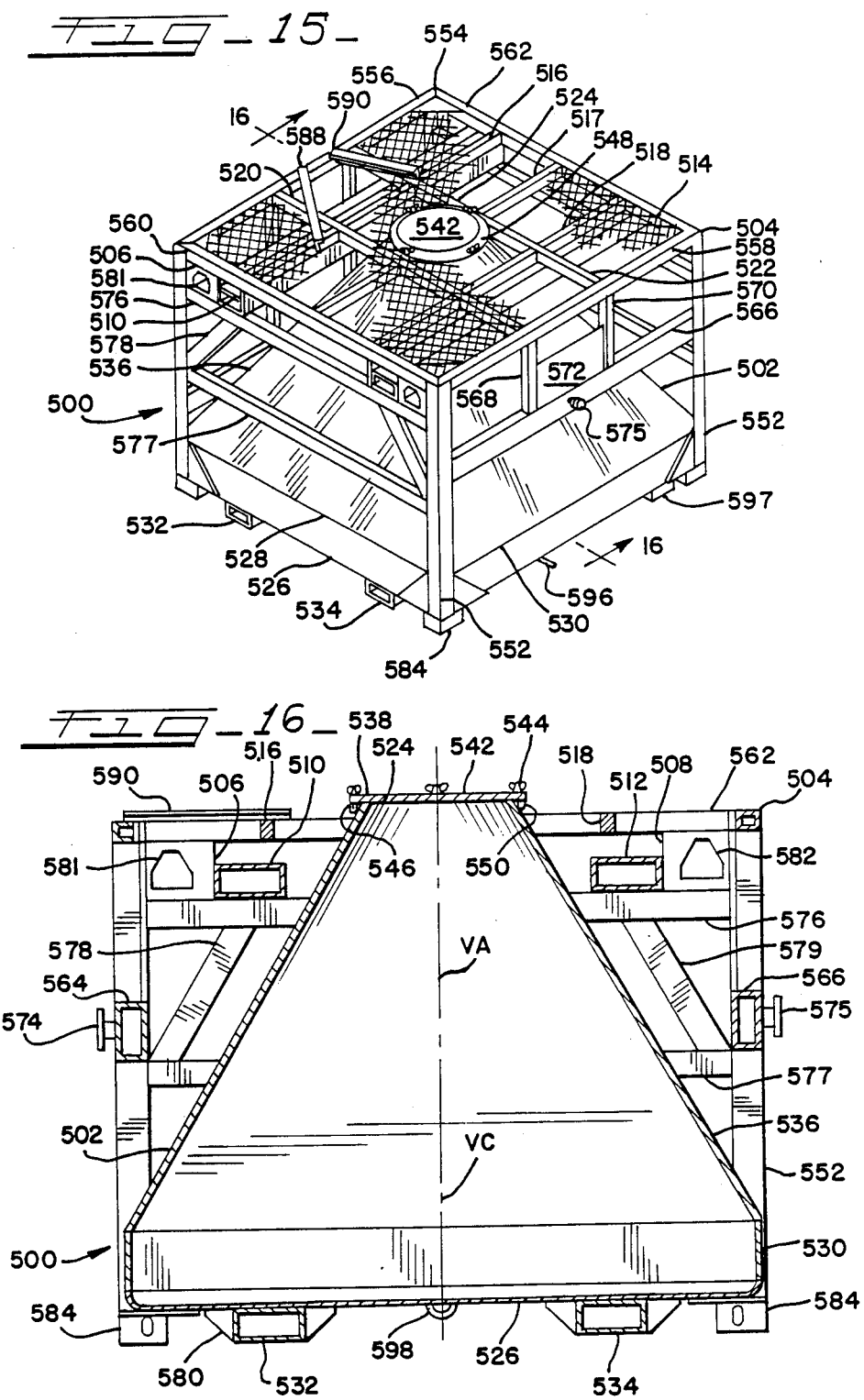

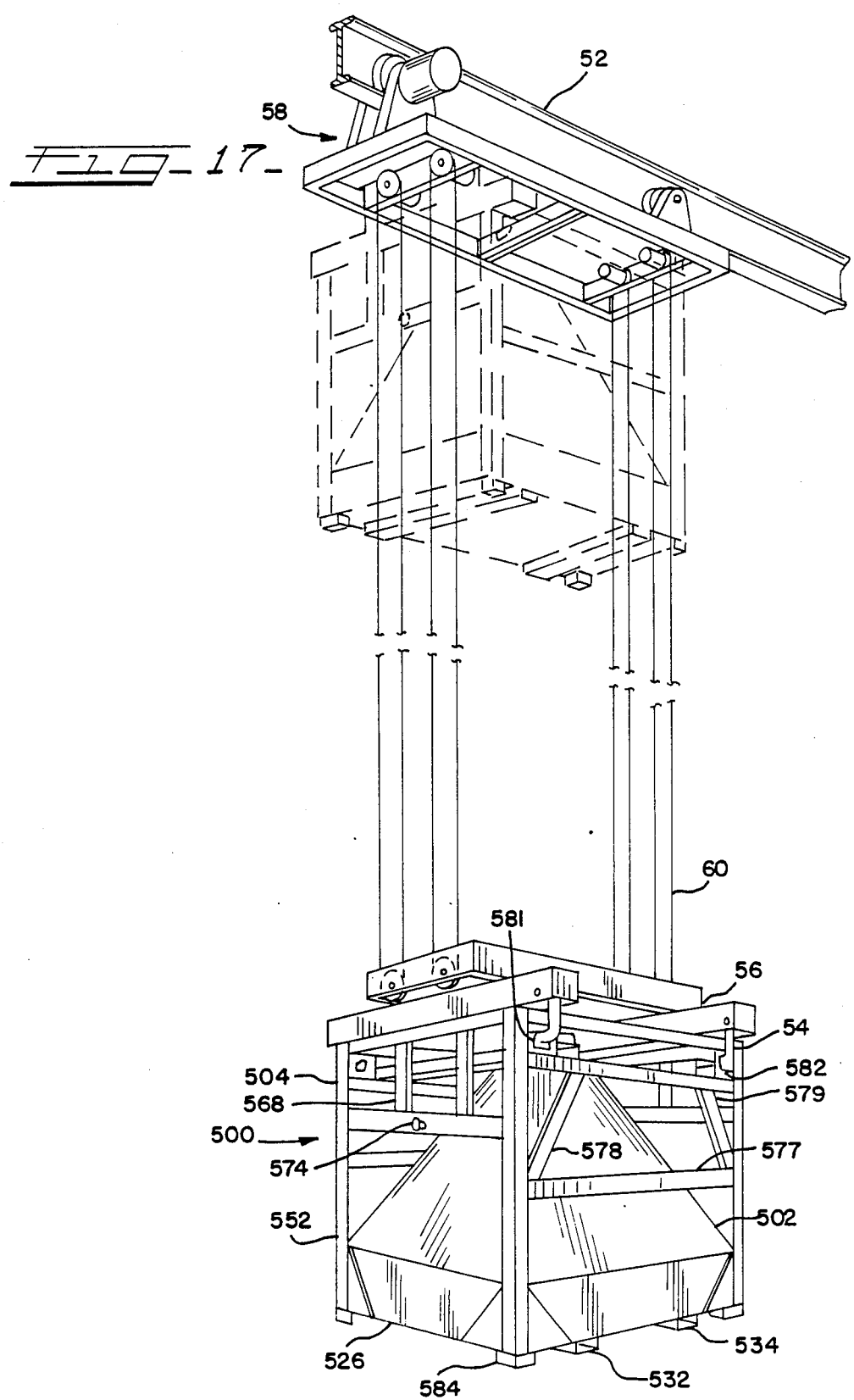

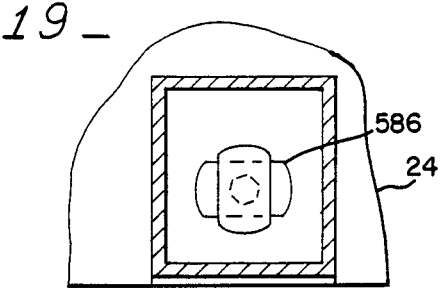
FIG_19
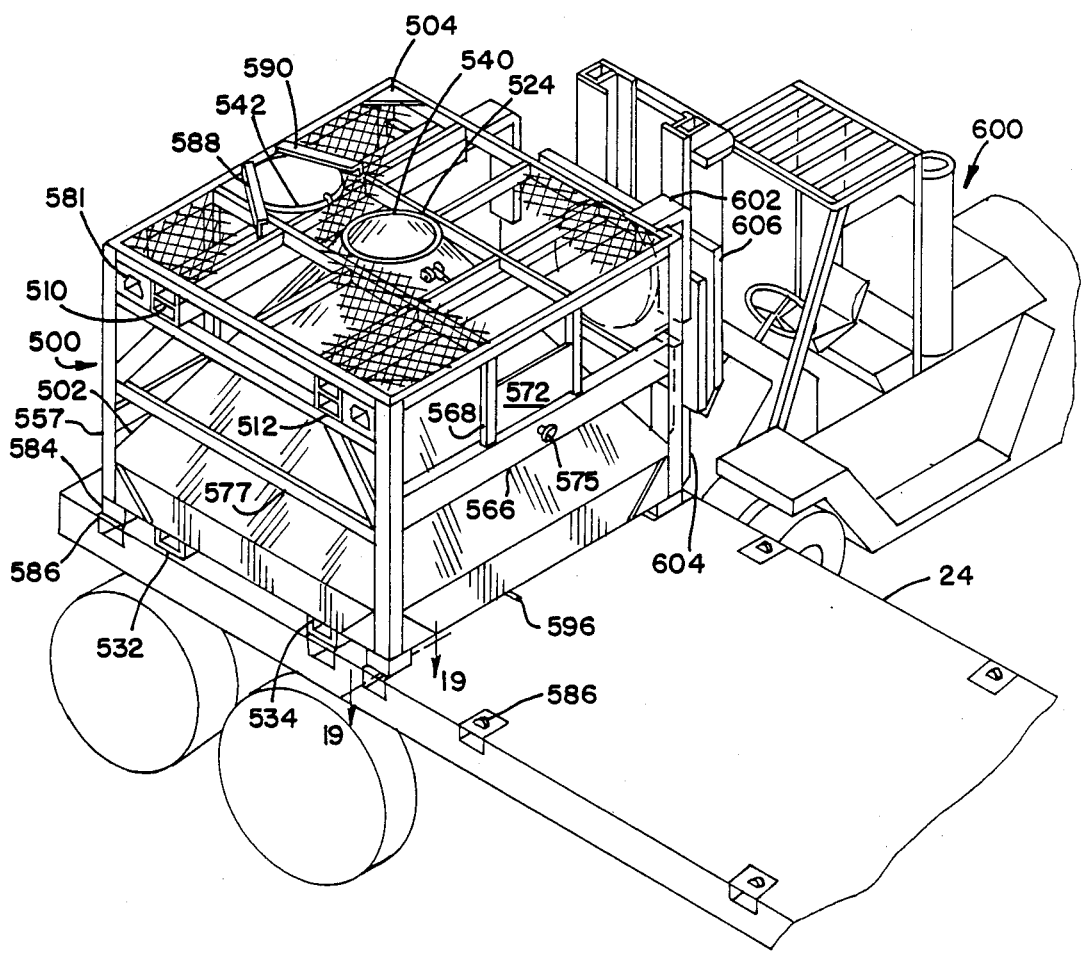
FIG_18

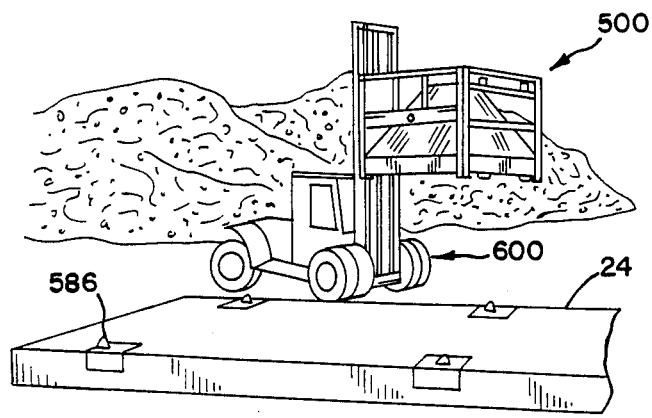
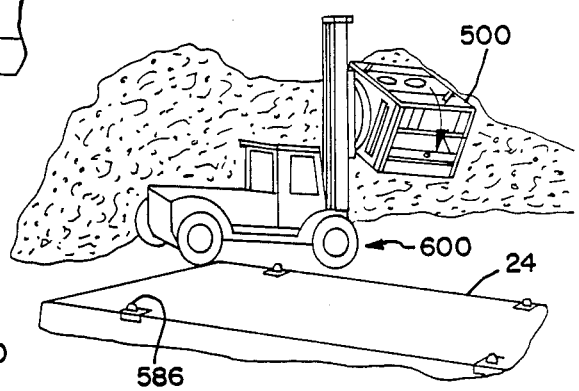
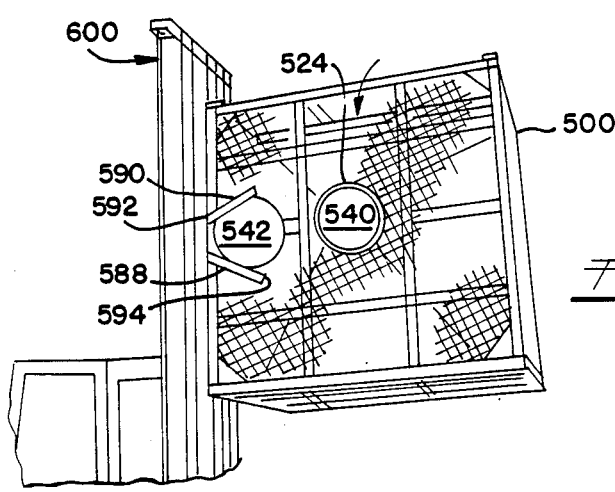
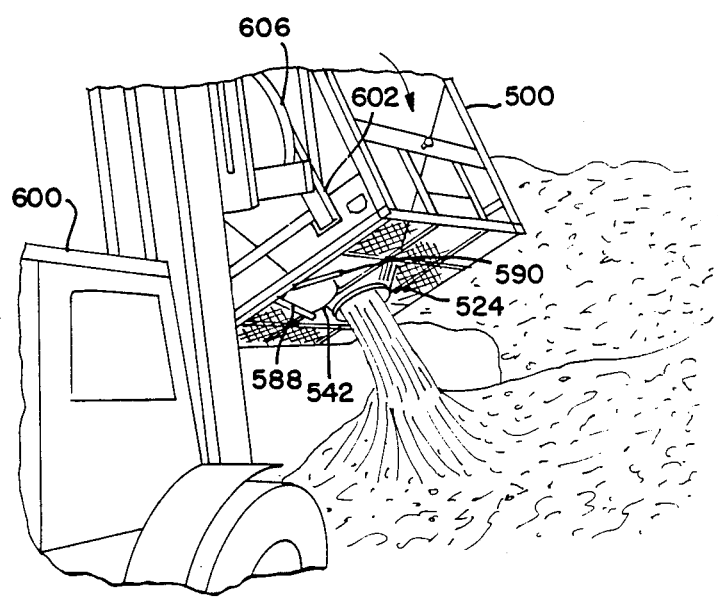

COMPUTERIZED MONORAIL CATALYST HANDLING PROCESS AND SYSTEM FOR RESID HYDROTREATING UNITS

BACKGROUND OF THE INVENTION

This invention relates to materials handling devices, and more particularly, to a process and system for transporting and dispensing catalyst into and out of resid hydrotreaters.

Spiraling oil costs, extensive price fluctuations, and artificial output limitations by the cartel of oil producing countries (OPEC) have created instability and uncertainty for net oil consuming countries, such as the United States, to attain adequate supplies of high quality, low-sulfur, petroleum crude oil (sweet crude) from Saudi Arabia, Nigeria, and other countries, at reasonable prices for conversion into gasoline, fuel oil, and petrochemical feedstocks. In an effort to stabilize the supply and availability of crude oil at reasonable prices, Amoco Oil Company has developed, constructed and commercialized within the past year extensive, multimillion dollar refinery projects under the Second Crude Replacement Program (CRP II) to process poorer quality, high-sulfur, petroleum crude oil (sour crude) and demetallate, desulfurize, and hydrocrack resid to produce high value products, such as gasoline, distillates, catalytic cracker feed, coke, and petrochemical feedstocks. The Crude Replacement Program is of great benefit to the oil consuming nations by providing for the availability of adequate supplies of gasoline and other petroleum products at reasonable prices while protecting the downstream operations of refining companies.

Amoco Oil Company's Crude Replacement Program advantageously utilizes ebullated expanded bed reactors for its resid hydrotreating units (RHU). In ebullated bed reactors, oil and hydrogen flow upward through a fixed amount of catalyst. The oil flows upwardly through the catalyst bed at a sufficient velocity to expand and maintain the catalyst in a state of random ebullated motion. Ebullated bed reactors were selected over fixed bed reactors because of the ebullated bed reactor's ability to economically process more types of feedstocks as well as their ability to readily adapt to changes in the feedstock's composition. Ebullated bed reactors desirably accommodate the addition and the withdrawal of catalyst onstream during regular use and operation without shutting the unit and they also minimize bed plugging.

The successful commercialization and use of ebullated bed reactors requires voluminous amounts of catalyst to be transported to and removed from the ebullated reactors daily. It also requires that used spent catalyst be deoiled before being shipped to a reclamation site or disposal area to protect the environment by preventing oil from dripping, spilling, and accumulating on the nation's highways as well as to maximize product yield. In order to safeguard and protect the reactors and associated refinery equipment, it is desirable to restrict trucks from driving anywhere close to the reactors and associated equipment. All of the above requirements create an enormous materials handling problem.

Over the years, a variety of receptacles, drums, containers, bins, cans, boxes, dispensers, and associated equipment, have been suggested for transporting, storing, and dispensing bulk materials, such as dry solids or liquids. These receptacles usually have one or more significant customized features to accommodate the specific material stored in the receptacle and/or to accommodate handling by special types of materials handling equipment. Typifying these prior art receptacles and associated equipment are those found in U.S. Pat. Nos. 1,285,074, 2,035,838, 2,161,988, 2,228,435, 2,293,160, 2,614,817, 2,681,746, 2,862,645, 2,929,658, 3,083,879, 3,111,242, 3,138,297, 3,162,330, 3,182,750, 3,198,395, 3,220,612, 3,224,653, 3,231,141, 3,318,486, 3,347,971, 3,407,971, 3,602,400, 3,785,534, 3,899,095, 4,027,787, 4,032,048, 4,281,729, and 4,474,507. These receptacles and associated equipment have met with varying degrees of success.

It is, therefore, desirable to provide a process and system for transporting catalyst to and from a reactor which overcomes many of the above problems.

SUMMARY OF THE INVENTION

An improved catalyst handling process and system is provided to safely, efficiently, and effectively transport catalysts to and from a reactor, such as a resid hydrotreating unit in an environmentally acceptable manner.

In the novel catalyst handling process, fresh catalyst is transported to a reactor. Petroleum feedstock is fed into the reactor where it is refined in the presence of the fresh catalyst. Spent catalyst is transported from the reactor to a discharge area. One of the many features of the process is that the fresh catalyst and/or the spent catalyst is transported at least in part by monorail. Preferably, the monorail travels from ground level to an elevated height and/or vice versa. In order to assure the integrity of the catalyst being dispensed into the reactors, the type and weight of catalyst being transported by the catalyst containers are periodically monitored and electronically sensed (detected).

In the preferred process, fresh catalyst is loaded into a special fresh catalyst container and is subsequently shipped in the container by rail or truck to a staging area at a petroleum refinery. In the staging area, the type of fresh catalyst stored in the fresh catalyst container is detected and the container is grasped and raised to an overhead monorail by the grab hooks of a monorail transport carrier. The fresh catalyst container is then carried by monorail and optionally by a lift elevator to a position above a fresh catalyst-holding vessel or inventory silo where the fresh catalyst is discharged with a tilt mechanism.

The type of catalyst within the fresh catalyst container is electronically detected at the staging area and tilt mechanism by engaging and tripping a limit switch with a catalyst-indicating pin that is operatively connected to the fresh catalyst container. The type of catalyst can also be concurrently detected at the staging area and tilting mechanism by weighing the fresh catalyst container and comparing that weight with a weight table of different types of catalyst (demetallation, desulfurization, etc.) for comparably loaded containers. The type of catalyst can also be visually marked on the exterior of the fresh catalyst container.

Hydrogen, as well as some crude, resid, or other feedstock is fed into an ebullated bed reactor. The fresh catalyst is also fluidly conveyed from the silo to the ebullated bed reactor. In the preferred form, the fresh catalyst is fluidly conveyed by nitrogen to a hopper and by a gas oil slurry to the reactor.

In the ebullated bed reactor, the crude oil, resid or other feedstock, is hydrotreated and ebullated in the presence of the hydrogen and fresh catalyst to produce upgraded oil leaving the spent catalyst coated (containing) with reactor oil. Periodically, the spent catalyst is withdrawn from the reactor. In order to protect the environment by preventing residual reactor oil from spilling on the nation's highways and increase product yield, substant,ial amounts of reactor oil are subsequently removed from the spent catalyst in a deoiling process before the spent catalyst is transported to a reclamation site or discharge area.

The deoiled spent catalyst is discharged through a pivotable swing chute to a spent catalyst container at a spent catalyst filling station. Desirably, the spent catalyst container is continuously weighed at the spent catalyst filling station and the flow of spent catalyst into the container is stopped when the total weight of the spent catalyst container has reached a predetermined amount. The loaded spent catalyst conveyor is grasped and raised by the grab hooks of a monorail transport carrier and carried by the overhead monorail back to the staging area.

The spent catalyst container is shipped by flatbed truck from the staging area to a remote reclamation site or dumping area without spilling, leaking, or accumulating residual reactor oil and spent catalyst on the nation's highways. At the reclamation site or dumping area, the spent catalyst is discharged from the spent catalyst container by rotating the spent catalyst container from its normally upright position to an inverted upside-down discharge position by rotatable tines (forks) of a forklift truck.

While the catalyst handling process can be carried out (performed) with many types of equipment, it is preferably carried out in a reactor that refines a petroleum feedstock in the presence of a fresh catalyst. The catalyst handling equipment and system should also include fresh catalyst transportation means for transporting the fresh catalyst to the reactor and spent catalyst transportation means for transporting spent catalyst from the reactor to a reclamation site or discharge area. A substantial portion of the fresh catalyst transportation means and/or the spent catalyst transportation means should comprise a monorail system for process efficiency.

In the preferred catalyst handling system, an ebullated bed reactor is provided to hydrotreat and ebullate sour crude oil, resid, or other petroleum feedstock, in the presence of hydrogen and fresh catalyst to produce upgraded oil, leaving spent catalyst containing reactor oil. The hydrogen and crude oil or other feedstock are fed into the reactor by a hydrogen injector and feed line, respectively. The preferred system also includes fresh and spent catalyst bins for containing fresh or spent catalyst and a warehouse which provides a staging area complex facility to store the catalyst bins. Detection equipment is provided to electronically detect the type of fresh catalyst stored in the fresh catalyst bin. Desirably, some of the detection equipment is housed in special intelligence pads in the staging area and tilt-mechanism discharge zone. The intelligence pads can be operatively connected to weigh scales to weigh the bins. The intelligence pads can also support limit switches for engaging catalyst-indicating pins attached to the fresh catalyst bins.

Catalyst holding vessels or silos can be used to store the fresh catalyst. Fluid conveying equipment is preferably used to convey the fresh catalyst from the silos to the reactor. In the preferred form, the fluid conveying equipment includes a hopper, a conduit extending between the silo and the hopper, nitrogen gas for conveying the fresh catalyst from the silo to the hopper in the conduit, another conduit extending between the hopper and the reactor, and a gas oil slurry for conveying the fresh catalyst to the reactor in another conduit.

As discussed previously, deoiling equipment is provided to remove a substantial amount of oil from the spent catalyst. A pivotable swing chute provides part of the spent catalyst filling equipment to fill (dispense) the spent catalyst bins with spent catalyst.

Desirably, an overhead monorail is provided to transport the fresh catalyst bins from the staging area to a discharge area above the silos, as well as to transport the spent catalyst bins from the spent catalyst filling zone to the staging area. In the preferred form, the monorail equipment includes a single overhead rail or track and a trolley which rides upon the rail. A transport carrier is operatively connected to the trolley and is raised and lowered from the trolley by cables. The transport carrier has grab hooks for grasping the fresh and spent catalyst bins.

A central processing unit is operatively connected to the monorail as well as to the catalyst detection equipment to automatically and remotely control the monorail, the detection equipment and the other electrical equipment in the system. The central processing unit includes a computer and a logic control board.

In the preferred form, an overhead crane is housed in the staging area facility and is operatively connected to the central processing unit. The overhead crane has grab hooks to grasp and position the fresh and spent catalyst bins on the intelligence pads as well as to lift and remove the bins from flatbed truck trailers.

Preferably, the tilt mechanism is operatively connected to the central processing unit. The tilt mechanism is driven by a motor and automatically tilts the fresh catalyst bin on its side to discharge the fresh catalyst contents of the bin into the silo, preferably as per a predetermined program or sequence.

A more detailed explanation of the invention is provided in the following description and appended claims taken in conjunction with the accompanying drawings.

BRIEF DESCRIPTION OF THE DRAWINGS

FIG. 1 is a perspective view of a catalyst handling process and system in accordance with principles of the present invention;

FIG. 2 is a perspective view of the resid hydrotreating units and associated refinery equipment;

FIG. 3 is a schematic flow diagram of the deoiling process and other portions of the catalyst handling process and system;

FIG. 4 is an enlarged schematic flow diagram of a catalyst silo and container tilt mechanism as well as some other portions of the catalyst handling process and system;

FIG. 5 is a cross-sectional view of an ebullated bed reactor;

FIGS. 6 and 7 are schematic flow diagrams of a train of reactors;

FIG. 8 is a schematic flow diagram of the deoiling process;

FIG. 9 is a fragmentary top view of the discharge chute and tops of spent catalyst containers;

FIG. 10 is a perspective view of a fresh catalyst container;

FIG. 11 is a cross-sectional view of the fresh catalyst container taken substantially along lines 11—11 of FIG. 10;

FIG. 12 is a perspective view of the fresh catalyst container being grasped by portions of an overhead monorail and showing in solid line the container in its lowered position and in dotted line the container in its raised position;

FIG. 13 is a cross-sectional view of the monorail grab channel and grab hooks taken substantially along line 13—13 of FIG. 12;

FIG. 14 is a front view of the catalyst-indicating pins and limit switches taken substantially along lines 14—14 of FIG. 12;

FIG. 15 is a perspective view of a spent catalyst container;

FIG. 16 is a cross-sectional front view of the spent catalyst container;

FIG. 17 is a perspective view of the spent catalyst container being lifted by portions of a monorail and showing in solid line the spent catalyst container in its lowered position and in dotted line the spent catalyst container in its raised position;

FIG. 18 is a perspective view of the spent catalyst container on a flatbed truck trailer;

FIG. 19 is a cross-sectional top view of a portolock locking mechanism; and

FIGS. 20-23 are perspective views of the spent catalyst container being sequentially removed from a flatbed truck and rotatably inverted to discharge the spent catalyst and oil from the container into a pile at a reclamation site.

DETAILED DESCRIPTION OF THE PREFERRED EMBODIMENT

A computerized monorail catalyst handling process and system for resid hydrotreating units is shown in the drawings.

As shown in FIG. 1, fresh hydrotreating catalyst is loaded in fresh catalyst containers, bins, or vessels 400 at a catalyst manufacturing facility 20 or supply house 22 and transported by flatbed truck 24 and railroad 26 to a staging area complex facility and warehouse 28 of an oil refinery 30 surrounded by aboveground tanks 32. The fresh catalyst containers are unloaded and removed from the flatbed trucks at the staging area facility by grab hooks 34 (FIG. 3) of a mobile bridge crane 36 and placed on an intelligence pad 38 where it is weighed by a weight scale 40 that is operatively connected to a central processing unit 42 comprising a computer 44 and a logic control board 46. The weight scale and central processing unit cooperate and interface with each other to determine whether the containers are empty or partially or fully filled with fresh or spent catalyst. A catalyst indicating pin 48 extending from the base of the fresh catalyst container engages a limit switch 50 on the intelligence pad, which is also operatively connected to the central processing unit, to electronically detect the type of catalyst contained in the fresh catalyst bin.

The fresh catalyst bin is then lifted off the intelligence pad and raised to the underside of an overhead monorail 52 (FIG. 3) by the grab hooks 54 of a monorail transport carrier 56. The monorail transport carrier is operatively connected to the monorail trolley 58 by cables 60. The trolley and the grab hooks are operatively connected to the central processing unit and are remotely and automatically controlled. The trolley and grab hooks also have manual override safety controls.

Each fresh catalyst container is carried by the overhead monorail from the staging area facility to a remote control, computerized lift elevator 62 (FIG. 3). The lift elevator raises the fresh catalyst container to a monorail spur 52' or 52''. The fresh catalyst container is carried and transported by the trolley on the monorail spur to a tilting mechanism and discharge assembly 64 or 66 (FIGS. 3 and 4) where the fresh catalyst contents of the bin are dumped into one of two fresh catalyst silos 68 or 70 depending on the type (composition) of the catalyst. The empty fresh catalyst containers are returned to the staging area, catalyst vendors and suppliers by reversing the above procedure.

The fresh catalyst is pneumatically conveyed from the silo through pneumatic transfer vessels 71–74 to a surge hopper 76 or 78 with nitrogen gas from nitrogen gas injectors 80. Smaller particles of the fresh catalyst are removed by vibrating screens 82 or 84. The removed smaller particles are carried by nitrogen gas through a horizontal air slide to a vertical chute and loaded into spent catalyst containers 500 on intelligence pads 38 positioned on weight scales 40 and transported to the staging area and reclamation site in a manner similar to the spent catalyst containers loaded with deoiled catalyst. Larger particles of fresh catalyst are passed to a storage hopper 86 or 88 from which they are fluidly conveyed to the reactors of a resid hydrotreating unit (RHU) by a heavy vacuum gas oil slurry.

As best shown in FIG. 2, each resid hydrotreating unit 90, 92 and 94 is a reactor train comprising a cascaded series or set of three ebullated bed reactors 96, 97 and 98. Hydrogen is injected into the ebullated bed reactors through feed line 100. A relatively high sulfur resid or sour crude is fed to the reactor where it is hydroprocessed (hydrotreated) and ebullated in the presence of the fresh and/or equilibrium catalyst and hydrogen to produce an upgraded effluent product stream leaving spent catalyst. As used throughout this patent application, the term "equilibrium catalyst" means a fresh catalyst which has been partially or fully used. The term "spent catalyst" as used in this patent application comprises equilibrium catalyst which has been withdrawn from the reactor. Hydroprocessing in the RHU includes demetallation, desulfurization, and hydrocracking. Hydroprocessing can convert most of the feedstock to lighter more valuable products, such as gasoline, distillates, catalytic cracker feed, and petrochemical feedstocks. The remaining portion of the products can be charged to cokers.

The resid hydrotreating units and associated refining equipment of FIG. 2 comprise three identical parallel trains of cascaded ebullated bed reactors 90, 92 and 94, as well as hydrogen heaters 101, influent oil heaters 102, an atmospheric tower 103, a vacuum tower 104, a vacuum tower oil heater 105, a hydrogen compression area 106, oil preheater exchangers 107, separators 108, recycled gas compressors 109, flash drums 110, separators 111, raw oil surge drums 112, sponge oil flash drums 113, amine absorbers and recycle gas suction drums 114, and sponge absorbers and separators 115.

Each of the reactor trains comprises three ebullated bed reactors in series. The feed typically comprises resid. Recycle gas can also be injected into the reactors along with the hydrogen gas. Demetallation primarily occurs in the first ebullated bed reactor in each train. Desulfurization primarily occurs in the second and the third ebullated bed reactors in each train. The effluent product stream typically comprises light hydrocarbon gases, hydrotreated naphtha, distillates, light and heavy gas oil and unconverted resid. The hydrotreating catalyst typically comprises a hydrogenating component on a porous refractory, inorganic oxide support.

The resid hydrotreating unit is quite flexible and, if desired, the same catalyst can be fed to one or more of the reactors or a separate demetallation catalyst can be fed to the first reactor while a desulfurization catalyst can be fed to the second and/or third reactors. Alternatively, different catalysts can be fed to each of the reactors, if desired. The used spent catalyst typically contains or is covered with nickel, sulfur, vanadium and carbon (coke). As much as 50 tons of catalyst are transported into, out of, and replaced in the ebullated bed reactors daily.

In use, fresh hydrotreating catalyst is fed downwardly into the top of the first ebullated bed reactor 96 (FIG. 5) through the fresh catalyst feed line 118. Hot resid feed and hydrogen enters the bottom of the first ebullated bed reactor 96 (FIG. 5) through feed line 100 and flows upwardly through a distributor plate 119 into the fresh catalyst bed 120. The distributor plate contains numerous bubble caps 121 and risers 122 which help distribute the oil and the gas across the reactor. An ebullating pump 123 circulates oil from a recycle pan 124 through a downcomer 125 and the distributor plate 119. The rate is sufficient to lift and expand the catalyst bed from its initial settled level to its steady state expanded level. The effluent product stream of partially hydrotreated oil and hydrogen-rich gases are withdrawn from the top of the reactor through effluent product line 126. The used spent catalyst is withdrawn from the bottom of the reactor through spent catalyst discharge line 127. The spent catalyst typically contains deposits of metals, such as nickel and vanadium, which have been removed from the influent feed oil during hydrotreating.

Catalyst particles are suspended in a two-phase mixture of oil and hydrogen-rich gas in the reaction zone of the reactor. Hydrogen gas typically continually bubbles through the oil. The random ebullating motion of the catalyst particle results in a turbulent mixture of the three phases which promotes good contact mixing and minimizes temperature gradients.

The cascading of the ebullated bed reactors in a series of three per reactor train, in which the effluent of one reactor serves as the feed to the next reactor, greatly improves the catalytic performance of the back-mixed ebullated bed process. Increasing the catalyst replacement rate increases the average catalyst activity.

As shown in FIGS. 6 and 7, the partially hydrotreated effluent of the first ebullated bed reactor 96 comprises the influent feed of the second ebullated bed reactor 97. The partially hydrotreated effluent of the second ebullated bed reactor 97 is the influent feed of the third ebullated bed reactor 98. The second and third reactors are functionally, operatively, and structurally similar to the first reactor and cooperate with the first reactor to effectively hydrotreat and upgrade the influent feed oil. Quench liquid (oil) and/or vapor can be injected into the influent feeds of the second and third reactors through quench lines 128 and 129 (FIG. 7) to cool and control the bulk temperatures in the second and third reactors. Fresh catalyst can be fed into the top of all the reactors, although for process efficiency and economy it is preferred to utilize catalyst staging by feeding fresh catalyst into the first and third reactors through fresh catalyst feed lines 100 and 130 (FIG. 6) and by feeding recycled spent catalyst from the third reactor into the second reactor through recycle catalyst line 131. For best results, the catalyst is fed downwardly into the ebullated bed reactor in countercurrent flow relationship t the influent oil and hydrogen feed. Used spent catalyst is discharged from the reactor through spent catalyst discharge lines 127 and 127'.

Preferably, vacuum resid is heated in the oil heater 102 (FIG. 2) and hydrogen is heated in the hydrogen heater 101 before being combined and fed through the feed line 100 into the first reactor, for process efficiency. The effluent product streams can be withdrawn from the bottoms or tops of the reactors, as preferred.

The fluid state of the ebullated hydrotreating catalyst enhances the flexibility of the ebullated bed reactors and permits the addition or withdrawal of oil slurry and catalyst without taking the reactors offstream. Daily catalyst replacement results in a steady state equilibrium catalyst activity.

Products are withdrawn from the bottom or top of the third reactor 98 and are separated into fractions of oil and gas in the towers and other processing equipment previously described.

The ebullated bed reactors are capable of handling atmospheric and vacuum resids from a wide range of sour and/or heavy crudes. Such crudes can have a gravity as much as 20° API, a sulfur content up to 8% by weight, and substantial amounts of nickel and vanadium. The ebullated bed reactors typically operate at a temperature above 700° F. and at a hydrogen partial pressure greater than 1500 PSIA.

Ebullated bed reactors have many advantages over fixed bed reactors. They permit operation at higher average temperatures. They permit the addition and withdrawal of catalyst without necessitating shutdown. They avoid plugging due to dirty feed.

Since the liquid resid feed does not usually have enough velocity to expand the catalyst bed above its settled level, liquid is recycled from the top of the reactor to the bottom of the reactor through a downcomer pipe and then pumped back up through the reactor at a sufficient velocity to attain the required degree of expansion.

The products produced from the resid hydrotreating units in the ebullated bed reactors include light hydrocarbon gases, light naphtha, heavy naphtha, light distillate, mid-distillate, diesel oil, light vacuum gas oil, heavy vacuum gas oil, and 1000+° F. resid. The light hydrocarbon gases and light naphtha can be fed into a vapor recovery unit. Heavy naphtha can be sent to a reformer. The mid-distillate oil is useful for producing diesel fuel and furnace oil, as well as for conveying and/or cooling the spent catalyst. Light and heavy vacuum gas oils are useful as feedstock for a catalytic cracker. The 1000+° F. resid can be sent to cokers to produce coke.

The fractionation section includes the atmospheric tower and the vacuum tower. The atmospheric tower produces four side-draw products in addition to the overhead products. These four side-draw products include heavy naphtha, light distillate, middle distillate, and light gas oil. The bottom stream from the atmospheric tower is sent to the vacuum tower.

The vacuum tower produces light vacuum gas oil (LVGO), heavy vacuum gas oil (HVGO) and a resid product. The heavy vacuum gas oil can be used to cool the spent catalyst. The resid is typically passed to the cokers.

After the fresh hydrotreating catalyst has been used to hydrotreat and upgrade the influent feed oil, the spent equilibrium catalyst is removed and loaded into spent catalyst containers, bins, or vessels 500 (FIGS. 3 and 8) on other intelligence pads 38. The spent catalyst containers are lifted from the intelligence pads at the deoiling station and spent catalyst-loading zone 132 to the spent catalyst return section 134 of the overhead monorail 52 by the grab hooks 54 of the monorail transport carrier 56. The spent catalyst containers are transported, carried, and returned by the overhead monorail to the staging area complex 28 where the containers are loaded onto a flatbed truck and shipped to a reclamation site or disposal facility for reclamation and/or disposal of the spent catalyst. The empty spent catalyst containers are returned to the deoiling station by reversing the above procedure.

In order to increase product yield and prevent residual reactor oil from spilling and dripping from the spent catalyst container onto the nation's highways, the spent catalyst is substantially deoiled before being loaded into the spent catalyst containers. To this end, special deoiling equipment 134, 136 and 138 (FIG. 3) comprising a deoiling system is operatively connected and positioned downstream of the resid hydrotreating units 90, 92 and 94 (FIGS. 1 and 2). The deoiling equipment includes a high pressure transfer vessel 140 (FIG. 8), spent catalyst inventory vessels 142, 144 and 146 (FIG. 3), inventory flows valves 148, 150 and 152, cooling drums or vessels 154, 156 and 158, cooling drum-outlet valves 160, 162 and 164, spiral classifiers 166, 168 and 170 having inlet feedhoppers 172, 174 and 176 and screw conveyors 178, 180 and 182 positioned at an incline within screw-conveyor housing-sections 184, 186 and 188, swingable (pivotable) spiral discharge chutes 190, 192 and 194 pivotally connected to the top of the housing-sections of the spiral classifiers, intelligence pads 38 with upright guide posts for holding spent catalyst containers, weigh scales 40 at the bottom of the intelligence pads operatively connected to the logic control board 46 and computer 44 of the central processing unit 42, a water-cooled heat exchanger or watercooler 196 (FIG. 8), a watercooler-inlet valve 198, a cooling drum inlet valve 200, one or more surge drums 202, 204 and 206 (FIG. 3), recycle centrifugal pumps 208, 210 and 212 and various interconnecting transfer lines, pipes, and conduits. The watercooler 196 can also be connected and communicate with the inlet feed line 220 through line 213 to cool the slurry of mid-distillate diesel oil and spent catalyst to a desired temperature below the flash point of the diesel oil before the diesel oil enters the inventory silo 142. A motor 214 (FIG. 8) rotatably drives the screw conveyors of the spiral classifiers.

The first reactor 196 (FIG. 6) is operatively associated with and connected to the deoiling equipment shown in FIGS. 3 and 8 as well as to a pair of intelligence pads 38 (FIG. 9). The second and third reactors 97 and 98 are each operatively associated and connected to similar deoiling equipment such as those shown downstream of vessels 144 and 146, respectively (FIG. 3).

In the deoiling process, a slurry of spent catalyst and effluent reactor oil is withdrawn from the ebullated bed reactors and fed through a spent catalyst slurry line 216 (FIG. 8) to the high-pressure catalyst-transfer vessel 140 where it is cooled to a temperature above the 165° F. flashpoint of mid-distillate diesel oil preferably to about 180° F. The cooled slurry is withdrawn from the transfer vessel 140 through discharge line 218 and conveyed with some mid-distillate diesel oil from diesel line 219 through transfer line 220 to the spent catalyst inventory vessel 142. The slurry is withdrawn from the inventory vessel 142 and gravitated to the cooling drum 154 via control valve 148 and lines 221 and 222. Positioned within the interior of the cooling drum is a vibrating tuning fork probe 224 which is operatively connected to the central processing unit. The vibrating tuning fork probe has two tines (fork-sections) 225 and 226 which are driven by two piezoelectric crystals 227 at the tines' resonance frequency. The tines extend into the oil-catalyst slurry in the interior of the cooling drum. The tuning fork probe can be mounted horizontally or vertically and is preferably positioned so that the times are located at or slightly below the lower 250 ft.$^3$ volume in the cooling drum so as to avoid overfilling the feedhopper 172 of the spiral classifer. When the solid catalyst particles closely surround the tines at a sufficient thickness, density and concentration, the tines cease to vibrate and a third piezoelectric crystal 228 becomes de-energized thereby activating a relay 229 operatively connected to the control valve 148 and the central processing unit. The vibrating tuning fork probe can respond in less than one-half second. The vibrating tuning fork probe electronically detects the presence or absence of spent catalyst and controls the amount of spent catalyst in the cooling drum. When the amount of spent catalyst sensed by the vibrating tuning fork probe has reached a preselected level, the flow of slurry from the inventory vessel 142 into the cooling drum 154 is blocked and stopped by control valve 148 operatively connected to the vibrating tuning fork probe and the central processing unit.

The slurry of catalyst and oil in the cooling drum 154 (FIG. 8) is cooled to a temperature below the flashpoint of the mid-distillate diesel oil, preferably to about 130° F. The cooling of the slurry is accomplished in the cooling drum by circulating and pumping a cooling oil comprising cooled mid-distillate diesel oil from oil lines 232–234 in direct heat exchange contact with the slurry in the drum 154. The effluent cooling oil is withdrawn from the cooling drum through effluent oil lines 236 and 238 and circulated through the water-cooled heat exchanger 196 where the effluent cooling oil is cooled. The cooled effluent oil is passed from the heat exchanger 196 to the spent catalyst surge drum 202.

The cooled slurry from the cooling drum 154 (FIG. 8) is conveyed by gravity flow through lines 240 and 242 to the feedhopper 172 of the spiral classifier 166. The cooled slurry is spirally conveyed from the feedhopper with the rotating screw conveyor blades 178 of the spiral classifier at an upward angle of inclination ranging from 15° to 60°. As this occurs, a substantial amount of the mid-distillate diesel oil from the spent catalyst is removed and drained to substantially deoil the spent catalyst. The removed oil is conveyed by gravity flow at a downward angle of inclination, generally opposite the angle of inclination of the screw conveyor 178, through the clearance around the circumference of the screw conveyor blades 178 along with bottom interior surface of the screw-conveyor housing-section 184. The removed oil flows in a general countercurrent flow relationship to the upwardly conveyed catalyst slurry.

The level of spent catalyst in the feedhopper 172 (FIG. 8) can be detected by thermal probes 246 and 248. The thermal probes include a high level catalyst indicator 246 and a low level catalyst indicator 248. The level of mid-distillate oil in the feedhoppers are detected by capacitance probes 250 and 252. There is a high liquid level indicator 250 and a low liquid level indicator 252. The probes are necessary in order to avoid passing catalyst to the pump 208 which could severally damage the pump and shutdown the deoiling system. When the low level catalyst indicator senses a low level of catalyst, the removed oil is recycled and drained from the feedhopper 172 through the drain line 254 into the surge drum 202. The capacitance probes are electrically connected to the feed valve 160 and serve as safety controls to close the feed valve when the high level capacitance probe 250 has detected a high level or overfill condition in the feedhopper and prevents the feed valve from opening and overfilling the feedhopper when the low level capacitance probe 252 has detected catalyst and oil present in the feedhopper (i.e, when the feedhopper is not empty).

The tuning fork probe 224 and the cooling drum 154 also serve as safety controls to electronically close the cooling drum valve 148 when about 250 cubic feet of catalyst slurry has filled the cooling drum to avoid overloading and damaging the spiral classifier.

Preferably, the feedhopper 172 (FIG. 8) is blanketed with nitrogen from nitrogen feed line 256 to remove hydrocarbon gases so as to enhance operator safety. A nitrogen purge is injected into the inventory vessel 142 through nitrogen purge line 258 to attain the desired pressure and help prevent oxygen from entering the inventory vessel 142.

The flow of deoiled catalyst is directed and dispensed at a downward angle of inclination by gravity from the top of the spiral classifier 166 (FIG. 8) through the discharge chute 190 into the top of a first spent catalyst container 500. The weight of the spent catalyst container is continuously sensed through the weigh scale 40 while the deoiled catalyst is fed into the spent catalyst bin. The weigh scale is operatively connected via the central processing unit to the motor 214 of the spiral classifier and optionally to cooling drum valve 160. The weigh scale, in cooperation with the central processing unit, de-energizes and stops the motor and optionally activates the flow valve to stop, shut off, and block the flow of deoiled catalyst into the container when the container being loaded with spent catalyst has reached a preselected weight. Thereafter, the discharge chute is pivoted to a position above the second spent catalyst container, as shown by the dotted line in Figure 2, and the deoiled catalyst is directed and dispensed through the discharge chute into the second spent catalyst container in a similar manner.

As the spent catalyst containers are filled to their desired weights, the tops of the containers are closed with a closure lid or cap. The spent catalyst containers are then grasped and lifted by the grab hooks 54 (FIG. 3) of the monorail transport carrier 56 and raised to the trolley 58 of an overhead monorail 52 where they are transported to the staging area complex facility 28. The spent catalyst containers are transported, carried, and returned by the overhead monorail to the staging area complex 28 where the containers are loaded onto a flatbed truck and shipped to a reclamation site or disposal facility for reclamation and/or disposal of the spent catalyst.

As shown in FIGS. 1 and 10, the fresh catalyst container 400 provides a bin, receptacle and assembly for safely and effectively handling, transporting, storing, and dispensing fresh catalyst from a catalyst manufacturing facility 20 or supply house 22 to a resid hydrotreating unit 90, 92, or 94 of a refinery 30.

As best shown in FIG. 10, the fresh catalyst container 400 has rectangular vertical upright walls 402–405 including parallel front and back rectangular, longitudinal walls 402 and 403 and parallel lateral rectangular sidewalls 404 and 405 extending laterally between and connecting the longitudinal walls. Rectangular horizontal end walls 406 and 408 provide a top (top wall) and a bottom (bottom wall) which extend between and connect the upright walls. The walls are fabricated of catalytically resistant metal, such as aluminum. The end walls and the upright walls cooperate with each other to provide substantially rigid imperforate barriers as well as a substantially impervious, fluid and solid-impermable, enclosure to contain the fresh catalyst. Outwardly facing, external rectangular wear plates 410 extend along the upright walls in proximately to the bottom to reinforce and protect the upright walls. The container is symmetrical about its vertical axis.

The top 406 (FIG. 10) has a circular access opening or port 412 for input and loading of unused fresh catalyst. A circular lid 414 and drum closure are pivotally connected to the top by hinges 416 and an o-ring and circular seal 418 is positioned about the opening to securely close and seal the access opening. The cover or top has a vent or descecant 417 (FIG. 11) to maintain the atmospheric pressure within the interior of the fresh catalyst container. Because the fresh catalyst may be hydroscopic and can readily absorb moisture, the descecant has a moisture absorber 419 to prevent moisture from entering the fresh catalyst container.

One of the lateral sides 404 (FIG. 10) has an outlet opening and discharge port 420 in proximity to the bottom 408 for discharge of fresh catalyst when the sidewall is tilted downwardly, such as with a tilt mechanism and dumping or discharge assembly 64 or 66 (FIGS. 11 and 12). The lateral sidewall 404 also has a rectangular side door, discharge door, or closure flap 422 that is pivotally connected to the sidewall by hinges 424 about the outlet opening 420 to cover and close the outlet opening. The side door has an interior pivotable latch and locking mechanism 426 (FIG. 11) radially connected to a bolt 428 (FIG. 10) having an outwardly-facing exterior, hexagonal bolt head 430. The bolt head matingly receives a power-driven, rotatable socket arm 65 (FIG. 4) of the tilting mechanism 64.

The tilting mechanism 64 (FIG. 4) is connected to the computer and has a motor-driven piston 67 for tilting the intelligence pad 38 and framework 69 about a fixed pivot post or leg 75 to tilt the fresh catalyst container at an angle of discharge ranging from 30° to 75° to empty (dump) the contents (fresh catalyst) of the container into the inventory silo 68 or 70 after the door of the container has been opened by the computer connected, rotatable socket arm 65. After the contents of the fresh catalyst container have been discharged, the rotatable socket arm closes the door and the tilting mechanism returns the emptied fresh catalyst container to its initial normally horizontal position for transport via the monorail and lift elevator to the staging area facility and complex.

The fresh catalyst container has downwardly sloping, truncated, frustro-conical, interior wall portions, false covers or baffles 432 and 434 (FIG. 11) which extend inwardly from the upright walls at an angle ranging from 35° to 50° toward the side door 404 to deflect and facilitate discharge (unloading) or fresh catalyst through the outlet opening.

Four portolock castings or legs 436 (FIG. 10) provide and lock-receiving mechanisms extend downwardly from the bottom corners of the fresh catalyst container to matingly engage and lockably receive portolock cylindrical pins of a flatbed truck trailer in order to secure the fresh catalyst container to the flatbed truck trailer during transport by truck.

A pair of open ended, parallel rectangular, tubular beams 438 and 440 (FIG. 10) provide lower forklift channels which extend laterally across and are mounted against the bottom of the fresh catalyst container. The forklift channels extend between and connect the front and back walls of the container and extend downwardly from the bottom of the container to receive the tines (forks) of a forklift truck. The forklift channels accommodate transport of the fresh catalyst container by forklift truck onto and off of flatbed truck trailers and railway cars. Triangular reinforcing plates or gussets 439 can be mounted to both upright sides of the forklift channels and to the underside of the bottom to reinforce and support the forklift channels and provide a protection barrier to minimize accidental damage by the tines of a forklift truck.

The front and back walls of the container have wall portions or grab-hook channel plates 442 and 444 (FIGS. 10, 12 and 13) positioned adjacent the top corners which provide pentagon-shaped, monorail- and bridge crane-grab channels, recesses or openings 446 and 448. The monorail- and bridge crane-grab channels extend laterally through the front and back walls to alternatively receive the grab hooks 54 (FIG. 12) of a monorail transport carrier 56 of an overhead monorail trolley 58 and the grab hooks 34 (FIG. 3) of a bridge crane 36 to facilitate transport by both a monorail 52 and a bridge crane 36.

A longitudinally extending, catalyst-indicating, limit switch-tripping pin or detent 450 or 452 (FIG. 10) is operatively connected to the front wall adjacent the bottom to engage a limit switch 50 or 51 (FIGS. 3, 12 and 14) on an upright switch board 53 near the bottom of the intelligence pad 38 to indicate the presence and type of fresh catalyst stored in the container. The pin is preferably elongated and cylindrical. In practice, only one pin is attached to the fresh catalyst container. The catalyst-indicating pin can be operatively attached to the container at the catalyst manufacturing facility, supply house, or at other locations.

A demetallation catalyst-indicating pin 450 (FIG. 10) indicates that a demetallation catalyst has been loaded into the fresh catalyst container. A desulfurization catalyst-indicating pin 450 indicates that a desulfurization catalyst has been loaded into the fresh catalyst container. The demetallation catalyst-indicating pin 450 is positioned to extend from the container at a location to engage and trip a demetallation catalyst-limit switch 50 (FIGS. 12 and 14) extending inwardly and positioned near the bottom of the intelligence pad 38. The desulfurization catalyst-indicating pin 452 extends outwardly from the fresh catalyst container at a location to engage and trip a desulfurization catalyst-limit switch 51 extending inwardly and a location near the bottom of the intelligence pad.

A circular visible display marker 454 (FIGS. 10 and 12) badge, coating, or indicator is marked and attached to the exterior surface of at least one of the upright walls, preferably all four of the upright walls, in proximity to the top to visually indicate the type of fresh catalyst stored in the container. Preferably, one color, such as red, indicates a demetallation catalyst and another color, such as gold, indicates a desulfurization catalyst. The visual display indicators are placed on the exterior vertical walls of the fresh catalyst container at the catalyst manufacturing facility, supply house, or at other locations, if desired. The visual indicator can be visually observed by the unit superintendent and the operators to quickly visually identify the type of catalyst contained within the sealed fresh catalyst container.

As shown in FIG. 12, the intelligence pad 38 has a rectangular base 39 bolted or otherwise secured to the floor of the staging area facility and complex. The base comprises a rectangular periphery of elongated rails or beams. A horizontal rectangular weigh-scale 40 is positioned within the interior of the base and is bounded by interior rectangular upright rails 41 or beams. The interior rails are positioned inwardly of and extend above the outer peripheral rails 39 to engage, receive, and support the bottom forklift channels of the fresh catalyst container 400 and the spent catalyst container 500. The interior beams transfer the load and weight of the containers to the weigh scale. The weigh scale is connected by wires to the logic control board 46 (FIG. 3) and computer 44 of the central processing unit 42.

Extending upwardly from each of the corners of the outerrails of the base is a vertical L-shaped post and guide rail 43 (FIG. 12). The post and guide rails, to guide, receive, and support the bottom corners and legs of the fresh catalyst container. The posts and guide rails have truncated outwardly flared tops 45 to facilitate entry of the bottom corners and legs of the container as well as to guide the container onto the intelligence pad. An upright limit-switch support board 53 (FIGS. 12 and 13) extends upwardly from the front rail of the base. The demetallation catalyst-limit switch 50 and desulfurization catalyst limit-switch 51 are mounted upon and extend longitudinally inwardly from the support board to engage the catalyst-indicating pins 450 and 452 of the fresh catalyst container. The limit switches are connected by wires to the logic control 46 (FIG. 3) board and the computer 44 of the central processing unit 42.

When the fresh catalyst container is positioned upon the intelligence pad, the weigh scale will determine the weight of the loaded catalyst container and the catalyst-indicating pin will trip the corresponding limit switch. The catalyst handling system, therefore, electronically senses the type of fresh catalyst (demetallation or desulfurization) within the interior of the sealed fresh catalyst container depending on which catalyst-indicating pin and limit switch have been engaged and tripped. Simultaneously, the system also electronically detects the weight of the fresh catalyst container and compares that weight with the previously inputed weight of a fully loaded container of fresh demetallation catalyst and a fully loaded container of fresh desulfurization catalyst, to electronically determine the type of fresh catalyst loaded in the interior of the fresh catalyst container.

In the preferred embodiment, the tilting mechanisms and dumping assemblies 64 and 66 (FIGS. 3 and 4) are pivotally mounted upon another similar intelligence pad 38. In this manner, the catalyst handling system can further electronically detect and sense the type of catalyst contained in the container before the fresh catalyst is dumped (discharged) into one of the inventory silos below the tilting mechanism assembly. This serves as a further safety control for the system.

The spent catalyst container and receptacle assembly 500 is provided to safely and effectively transport, store, and dispense used spent catalyst from a resid hydrotreating unit to a reclamation site or other disposal area. The spent catalyst container is rotatable from a normally upright input position when transporting, storing, and filling the container with spent hydrotreating catalyst and residual reactor oil from the resid hydrotreating unit to an inverted upside-down discharge position when discharging the spent catalyst and the residual reactor oil from the container at the catalyst reclamation site or disposal area, and vice versa.

As shown in FIGS. 15 and 16, the spent catalyst container comprises a truncated, frusto-conical vessel or frustrum-shaped bin 502 which is annularly surrounded, interconnected, and supported by a rectangular frame assembly 504. The frame assembly enhances the structural strength and integrity of the bin and serves as the framework and interface to support the upper forklift channels 510 and 512 (FIG. 16) and the monorail- and bridge crane-receiving slotted wall portions 506 and 508. The frame also includes a rectangular, planar, or flat, wire mesh-grid 514 (FIG. 15) support platform, comprising an expanded metal grating, which is supported and seated upon a matrix of interconnected longitudinal and lateral horizontal bars 516–518 and beams 520 and 522 about the top 524 of the bin for providing access and support of personnel about the top of the bin.

The bin has a planar or flat rectangular base or bottom 526 and a circular top 524 that is substantially smaller than the base. The top and the base are parallel and normally horizontal. Upright wear plates 528 and 530 provide side walls which extend vertically upwardly from the rectangular base to further enhance the structural strength and integrity of the bin as well as to provide an auxiliary barrier and protection shield about the lower forklift channels 532 and 534 to minimize accidental damage from tines of the forklift trucks. In the illustrative embodiment, each of the wear plates and side walls has a rectangular shape. Collectively, the wear plates have a rectangular cross-section as viewed from the top and include parallel longitudinal wear plates 528 and parallel lateral wear plates 530 which extend between and connect the longitudinal wear plates. Elongated truncated, frusto-conical or frustrum-shaped walls or sides 536 extend upwardly at an inward acute angle of inclination from 45° to 75°, and preferably 60°, from the wear plates to the top. The frusto-conical walls have a rectangular cross-section as viewed from the top. It has been found that the 60° angle of inclination of the frusto-conical walls (sides) provide unexpected surprisingly good results for enhancing the efficiency and flow rate of spent catalyst and reactor oil into and out of the spent catalyst container.

The bin is fabricated of rigid oil-impermeable catalytically-resistant, solid impervious metal, such as carbon steel. An annular gasket and seal 538 (FIG. 16) can be positioned coaxially about the top. The bin has a volumetric center VC (FIG. 16) and is symmetric about its vertical axis VA. The top has a horizontal port or mouth 540 (FIGS. 18 and 22) which provides an access opening and discharge hole for input and discharge of reactor oil and spent catalyst into and out of the bin.

The access opening provides the only opening in the vessel. The positioning of the only opening at the top of the container in cooperation with the special shape of the bin, the annular seal and other features of the container effectively prevent the spent catalyst and residual reactor oil content within the container from leaking or spilling upon roads and highways. A removable circular lid 542 detachably closes and seals the opening. Wingnut swing bolts 544 (FIG. 16) or other fasteners detachably connect the lid 542 to bolt-mountings 546 or an annular flange 548 (FIG. 15) about the top. Alternatively or in addition thereto, spring-loaded toggles 550 (FIG. 16) can be provided to detachably connect the lid to toggle-receiving members of the angular flange or support platform.

In one example, the spent catalyst bins which have been constructed and successfully used in commercial operations within the past year at the Amoco Oil Company Refinery in Texas City, Tex., had an 8 foot square base, a 2 foot diameter access opening, a height slightly less than 7 feet, and an interior volume of 125 cubic feet. The interior volume of the spent catalyst containers are about ½ of the volume of fresh catalyst containers since the spent catalyst and residual reactor oil loaded in the spent catalyst container at the spent and deoiling filling station weigh about twice as much as an equivalent amount of unused fresh catalyst.

The frame assembly 504 (FIG. 15) has vertical posts 552 extending upwardly from each corner of the rectangular base 526 to about the height of the top of the bin. A rectangular horizontal peripheral support assembly 554 comprising parallel longitudinal L-shaped, support rails or beams 556 and 558 and parallel lateral L-shaped, support rails or beams 560 and 562 extending between and connecting the longitudinal rails, are welded or otherwise secured to the top of the post. The top support assembly 554 has a rectangular shape as viewed from above the top of the bin. The support rails serve to support and reinforce the posts. The support rails also serve to support the periphery of the wire mesh-grid support platform 514. Longitudinal support beams 564 and 566 (FIG. 16) extend longitudinally between and connect the post above the height of the volumetric center of the bin along the longitudinal sides of the frame assembly. Parallel vertical bars 568 and 570 (FIG. 16) extend between and connect a longitudinal beam 566 or 564 to the top longitudinal support rails 558 or 556. The vertical bars are positioned symmetrically about the volumetric center and serve as additional support for the top longitudinal support rails.

A flat or planar metal display sign 572 (FIG. 15) can be positioned between one of the pairs of vertical bars and is preferably welded to the bottom of the vertical bars along the top center portion of the longitudinal beam. The display sign can have an S-shaped opening or other indicia thereon to designate the orientation of the bin in the south position.

Trunnions 574 and 575 (FIGS. 15 and 16) extend laterally outwardly from the center of the longitudinal beams to facilitate manual auxiliary, spanner (spreader) bar-rotation of the bin from a normally upright position to an inverted upside-down position to accommodate manual discharge of the contents in the bin.

Upper lateral support beams 576 (FIG. 16) extend laterally between and connect the post at a position spaced below but in proximity to the top to support the upper forklift channels 510 and 512 and grab-hook channels 506 and 508. Intermediate parallel lateral beams 577 extend laterally between and connect the center portions of the post at a position below the trunnions. The intermediate beams provide additional support for the frame assembly. Diagonal braces 578 and 579 extend upwardly and inwardly at an acute angle from the top end portions of the intermediate beams adjacent the posts to the bottom portions of the upper lateral beam 576 below the upper forklift channels for additional support. In the illustrative embodiment the diagonal braces are positioned at about the same 60° angle of inclination as the inclined frusto-conical walls 536 of the bin.

Upper parallel forklift channels 510 and 512 (FIG. 16) are mounted above the upper portions of the diagonal braces 578 and 579 along the upper surfaces of the upper lateral beams 576. The forklift channels extend longitudinally across and are connected and seated upon the upper lateral beams. The upper forklift channels comprise rectangular steel tubes or tubular beams with a rectangular cross-section. The upper forklift channels receive the upper tines of a rotatable forklift truck. Lower parallel forklift channels 532 and 534 are mounted along the underside of the base of the bin. The lower forklift channels extend downwardly from the base 526 and longitudinally across the base. The lower forklift channels are positioned closer together than the upper forklift channels for enhancing inversion of the spent catalyst container as well as to minimize stress on the spent catalyst container during rotation of the container due to shifting of the container's center of gravity. Preferably the lower forklift channels are of the same size, shape, and construction as the upper forklift channels. The lower forklift channels comprise rectangular steel tubes or tubular beams with a rectangular cross-section. The lower forklift channels receive the lower tines of a rotatable forklift truck. The upper and lower forklift channels cooperate with each other and the tines of the forklift truck 600 (FIGS. 18 and 20-23) to facilitate rotation of the bin from a normally upright input position when transporting, storing, and filling the bin with spent catalyst and residual reactor oil from the resid hydrotreating unit to an inverted upside-down discharge position when discharging spent catalyst and residual reactor oil from the bin at the reclamation site or disposal area and vice versa.

In the preferred embodiment, a four prong (tine) (FIGS. 18 and 20-23) has a pair of upper tines 602 (FIG. 18) and a pair of lower tines 604 which extend forwardly and are cantilevered from a motor driven rotator 606. The tines or forks are parallel, normally horizontal, and in registration with each other. The upper and lower tines matingly engage and fit into the upper and lower forklift channels of the spent catalyst bin. Since the spent catalyst container is symmetrical about its vertical axis, the tines can be inverted into either the front or back open ends of the upper and lower forklift channels. When the tines are properly inserted into the forklift channels, the forklift can raise and lower the spent catalyst container onto and off of a flatbed truck, support, move and carry the container, and rotate the container from an upright filling, transport and storage position to an upside-down inverted dumping position and vice versa by rotating the tines via the rotator.

Triangular reinforcing wear plates or gussets 580 (FIG. 16) can be mounted to the upright sides of the lower forklift channels and to the underside of the base adjacent the exterior surface of the bin to reinforce and support the lower forklift channels and to provide a protection barrier to minimize accidental damage by the lower tines of a forklift truck.

Rectangular grab-hook channel plates 506 and 508 (FIG. 16) are mounted laterally between the upper forklift channels 510 and 512 and the posts and extend vertically between the upper lateral beams 576 and the top lateral support rails 560 and 562 (FIGS. 15 and 16). These plates provide lateral wall portions and have generally pentagon-shaped monorail- and bridge crane-receiving slots or openings 581 and 582 to alternatively receive the grab hooks 54 (FIG. 17) of a monorail transport carrier 56 of an overhead monorail trolley 58 and the grab hooks 34 (FIG. 3) of a bridge crane 36 to facilitate transport by both a monorail 52 and a bridge crane 36.

Portolock castings or legs 584 (FIGS. 15 and 16) extend downwardly from the corners of the base of the bin below the posts to matingly engage and lockably receive retractable or pivotable portolock pins 586 (FIG. 18) of a flatbed truck trailer 24 in order to secure the spent catalyst container to the flatbed truck trailer during transport by truck.

The frame assembly 504 (FIG. 15) also includes intermediate top rails 516-518, 520 and 522 which extend longitudinal and laterally between the rectangular peripheral support rails 556, 558, 560 and 562 about the opening of the top to support the rectangular wire meshed-grid support platform 514. The wire meshed-grid support platform provides access and support of personnel about the top of the bin.

Lid-retention guide rails 588 and 590 (FIGS. 15, 18 and 22) can be mounted upon the support platform either laterally or longitudinal of the top opening. In the illustrative embodiment, the guide rails are L-shaped and straight. The rails are positioned at an acute angle of inclination relative to each other and have converging ends 592 (FIG. 22) and diverging ends 594. The diverging ends are spaced apart from each other and span a distance substantially greater than the diameter of the circular lid 542 to provide an access mouth or opening for entering and removing the lid from the lid-retention guide rails. The converging ends are spaced apart from each other and span a distance substantially less than the diameter of the lid so that the lid can be snugly held, securely engaged, and wedged by the lid-retention guide rails when the lid is inserted and wedged between the guide rails through the access mouth. Preferably, the guide rails diverge generally in the direction of and are symmetrically positioned about the opening 540 in the top of the bin. The guide rails cooperate with each other to firmly hold the lid when the lid has been detached from the opening and the bin is rotated to an inverted upside-down discharge position. One or more wing-nut swing bolts can also be provided to fasten the lid to the guide rails.

In the preferred embodiment, the bin, frame assembly and most other parts of the spent catalyst container are constructed of carbon steel. During transport and storage the longitudinal and lateral beams and rails, as well as the forklift channels, are normally horizontal.

The spent catalyst container can also have high and low level indicators operatively connected thereto. The spent catalyst container can further have a spent catalyst indicating-pin 596 (FIG. 15) extending outwardly from the bin or a downwardly extending block 597 in proximity to the base to engage and trip limit switches mounted upon the interface board of the intelligence pads at the spent catalyst filling station and at the staging area, to electronically indicate, along with the weight scales, to the central processing unit and operator that the container is a spent catalyst container and is either empty or fully loaded with spent catalyst. A U-shaped inverting loop 598 (FIG. 16) can extend downwardly from the base along the vertical axis of the bin and adjacent the front of the bin to further accommodate manual inversion of the bin, such as with a spanner-bar crane, if desired.

The preferred catalyst handling system includes both fresh catalyst containers and spent catalyst containers. The fresh catalyst containers have a top which defines an inlet, a lid which snugly covers the top, a side-door which defines an outlet in proximity to the bottom, a bolt head and latch assembly for releasably closing the door, and hinges to pivotally connect the door to the side wall of the container.

The spent catalyst container has a top which defines a dual purpose opening for inflow and outflow of spent catalyst. The opening provides the only opening in the spent catalyst container.

Railroad cars and flatbed trucks ship the fresh catalyst containers to the special warehouse facility that provides the staging area and complex to store the containers. Other flatbed trucks are provided to ship the spent catalyst containers from the staging area to a catalyst reclamation site. At the reclamation site, a forklift truck having four rotatable tines removes the spent catalyst container from the flatbed truck, carries the spent catalyst container to a disposal pile, and turns the spent catalyst container upside-down to empty the spent catalyst from the container into a pile.

Intelligence pads having upright posts guide, receive and contain the fresh and spent catalyst containers. The intelligence pads house weigh scales to weigh the containers. Some of the intelligence pads are located in the staging area while other intelligence pads are located at the spent catalyst filling zone and at the tilt mechanism. Limit switches are operatively connected to the intelligence pads. Catalyst-indicating pins extend from the fresh catalyst bins to cooperatively engage and trip the limit switches to indicate the type of catalyst stored in the fresh catalyst container.

A bridge crane in the staging area moves the fresh catalyst container from the flatbed truck to one of the intelligence pads in the staging area. The bridge crane also moves spent catalyst containers from the intelligence pads to the other flatbed trucks for transport to the reclamation site.

A tilting mechanism and discharge assembly is located above the fresh catalyst inventory silo. The tilting mechanism tilts the fresh catalyst container and discharges the contents (fresh catalysts) into the fresh catalyst inventory silo. The tilting mechanism has a power-driven socket arm to rotatably engage the bolt head and unlock the side-door of the fresh catalyst container during discharge (dumping).

A surge hopper is located downstream of the fresh catalyst inventory silo to regulate the inventory of fresh catalysts. A nitrogen feed line communicates with a pneumatic feed line to pneumatically convey the fresh catalyst from the inventory silo to the surge hopper. The vibrating screen mechanism is operatively associated with the surge hopper to remove smaller particles of fresh catalysts. The storage hopper stores larger particles of fresh catalyst. A hopper-transfer line extends between the vibrating screen mechanism and the storage hopper to pass the larger particles of fresh catalyst from the vibrating screen mechanism to the storage hopper. A gas oil feed line feeds a heavy vacuum gas oil slurry to a slurry transfer line to fluidly convey the fresh catalyst to the reactor train of three ebullated bed reactors.

A resid feed line feeds a relatively high sulfur resid to the reactor train of ebullated bed reactors. The hydrogen line or injectors inject a sufficient amount of hydrogen into the ebullated bed reactors to hydroprocess the resid in the reactors in the presence of fresh catalyst to produce an upgraded effluent product stream leaving spent catalyst containing reactor oil. The fresh catalyst can comprise a demetallation catalyst to remove a substantial amount of metals from the resid in the ebullated bed reactors. Alternatively, the fresh catalyst can comprise a desulfurization catalyst to remove a substantial amount of sulfur from the resid in the ebullated bed reactors. An atmospheric tower and a vacuum tower separate the effluent product stream into fractions of oil and gas.

A deoiler unit removes a substantial amount of oil from the spent catalyst. In order to increase product yield and prevent oil from being accidentally discharged upon the nation's highways from the spent catalyst during transport to the reclamation site, the deoiling unit (deoiler) has a pivotable discharge chute to direct the flow of spent catalyst into the spent catalyst container on one of the intelligence pads in the spent catalyst bin-filling zone.

An integral part of the catalyst handling system includes the monorail transport equipment. In the illustrated embodiment, the monorail transport equipment includes a remote controlled trolley with wheels which ride upon a monorail-track. The remote controlled trolley is positioned and rides generally below the monorail track. An overhead fresh catalyst monorail-track extends between the staging area and a lift elevator. The lift elevator lifts the trolley from the monorail track to a monorail-spur. The monorail spur extends between the elevator and the tilting mechanism. An overhead spent catalyst monorail track extends between the spent catalyst bin-filling zone and the staging area.

The monorail transporter equipment also includes a monorail transport carrier. The monorail transport carrier is connected to the overhead, remote controlled trolley by retractable cables. The monorail transport carrier has remote controlled grab hooks which are operatively connected to the monorail transport carrier to grasp and carry the fresh catalyst containers on the fresh catalyst monorail-track and spur from the intelligence pads in the staging area to the inventory silo as well as to grasp and carry the spent catalyst containers on the spent catalyst monorail-track from the intelligence pads in the spent catalyst bin-filling zone to the intelligence pads in the staging area.

The components of the catalyst handling system are remotely controlled and connected to a central processing unit comprising a computer and a logic control unit. The monorail transport carriers and trolleys are not required to be manned with drivers, operators, or engineers since in the preferred embodiment the monorail transport carriers and trolleys are automatically controlled by the central processing unit. The logic control unit is connected by various wires to the weigh scales and limit switches in the intelligence pads to electronically detect the type of catalyst contained in the catalyst containers, as well as to the monorail trolley and grab hooks to remotely control the monorail trolley and grab hooks. The logic control unit is also connected to the tilting mechanism to remotely control the tilting mechanism. The central processing unit coordinates, controls, integrates, and interfaces with the monorail system, including the monorail trolley, carrier, grab hooks and lift elevators, the intelligence pads including the weight scales and limit switches, the bridge crane and grab hooks, the tilt mechanism, and controls of the deoiling system and discharge chute.

The ebullated bed reactors, catalyst handling equipment and other associated equipment described above can also be useful for processing, refining and hydrotreating synthetic petroleum feedstock, such as shale oil, tar sands oil and tar sands bitumen.

The above resid hydrotreating unit and computerized monorail catalyst handling process equipment and system have been built, constructed, and extensively tested in the Amoco Oil Company Refinery at Texas City, Tex. The resid hydrotreating unit and computerized monorail catalyst handling process equipment and system have been commercially successful to process and upgrade substantial quantities of sour crude and resid into gasoline and other valuable petroleum products in order to decrease America's dependence on foreign oil from Saudi Arabia, Nigeria, etc. Advantageously, the novel catalyst handling system is capable of automatically and continuously operating 24 hours a day and is flexible to interface with trucks, railroads, and other modes of transportation as well as to accommodate variations in manpower and staffing. Significantly, the catalyst handling process and system can automatically distinguish between fresh and spent catalyst, demetallation and desulfurization catalysts, full, partially-full and empty containers, and fresh and spent catalyst containers. The handling innovative catalyst handling arrangement provides a significant technical advance and an effective and efficient state of the art system which can readily and advantageously interface with and accommodate a nationwide network of catalyst suppliers and manufacturers.

Although embodiments of this invention have been shown and described, it is to be understood that various modifications and substitutions, as well as rearrangements of parts, components, equipment and/or process steps, can be made by those skilled in the art without departing from the novel spirit and scope of this invention.

What is claimed is:

1. A catalyst handling process for use in an oil refinery, comprising the steps of:
   loading fresh catalyst into a fresh catalyst container;
   shipping said fresh catalyst container to a staging area;
   grasping said fresh catalyst container with the grab hooks of a monorail transport carrier;
   raising said grasped fresh catalyst container to an overhead monorail with said monorail transport carrier;
   carrying said fresh catalyst container by monorail to a position above a fresh catalyst-holding vessel;
   discharging fresh catalyst into said vessel from said fresh catalyst container;
   fluidly conveying said fresh catalyst from said vessel to at least one reactor train comprising a series of ebullated bed reactors;
   feeding substantially sour crude oil to said train of ebullated bed reactors;
   injecting hydrogen into said train of ebullated bed reactors;
   hydrotreating and ebullating said crude oil in said train of ebullated bed reactors in the presence of said hydrogen and said fresh catalyst to produce upgraded oil leaving spent catalyst;
   removing spent catalyst containing oil from said train comprising said series of ebullated bed reactors;
   substantially separating and removing said oil from said spent catalyst;
   conveying said spent catalyst to a spent catalyst container;
   grasping said spent catalyst container with the grab hooks of said monorail transport carrier;
   raising said grasped spent catalyst container to said overhead monorail with said monorail transport carrier;
   carrying said spent catalyst container by said overhead monorail to said staging area;
   shipping said spent catalyst container from said staging area to a remote dumping site; and
   dumping said spent catalyst from said spent catalyst container at said dumping site.

2. A catalyst handling process in accordance with claim 1 wherein said spent catalyst container is shipped to said dumping site by a flatbed truck, said container is removed from said truck by a forklift at said dumping site, and said container is rotated to an upside-down position to dump said spent catalyst at said dumping site.

3. A catalyst handling process in accordance with claim 1 wherein said fresh catalyst is loaded into the top of said fresh catalyst container, said fresh catalyst container is tilted, and said fresh catalyst is discharged into said vessel from the bottom portion of a side of said fresh catalyst container.

4. A catalyst handling process in accordance with claim 3 wherein said fresh catalyst container is shipped by a flatbed truck and unloaded by a crane in said staging area, electrically detecting the type of catalyst in said fresh catalyst container in said staging area by engaging a limit switch with a catalyst indicating pin operatively connected to said fresh catalyst container, and weighing said fresh catalyst container on a scale in said staging area.

5. A catalyst handling process in accordance with claim 1 wherein said fresh catalyst is fluidly conveyed by nitrogen gas to a hopper and then to said reactor by a gas oil slurry.

6. A catalyst handling process in accordance with claim 1 wherein said spent catalyst is conveyed by gravity flow to said spent catalyst container; said spent catalyst container is continuously weighed during said conveying; and the flow of spent catalyst into said container is stopped when the weight of said spent catalyst container reaches a preselected value.

7. A catalyst handling process for use in an oil refinery, comprising the steps of:
   loading fresh catalyst into the top of a fresh catalyst bin;
   shipping said fresh catalyst bin by railroad and upon a flatbed truck to a staging area in an oil refinery;
   removing said fresh catalyst bin from said flatbed truck with a bridge crane;
   positioning said fresh catalyst bin on an intellgence pad in siad staging area with said bridge crane;
   weighing said fresh catalyst bin on a scale in said intelligence pad while simultaneously tripping a limit switch with an indicator pin extending outwardly from said bin;

lifting said fresh catalyst bin from said intelligence pad to a monorail trolley on the underside of an overhead monorail with grab hooks of a monorail transport carrier, said carrier being operatively connected by cable to said trolley;

transporting said fresh catalyst bin by remote control to an elevator with said trolley on said monorail;

raising said catalyst bin, said trolley and said monorail transport carrier to an elevated monorail spur by said elevator;

transporting said fresh catalyst bin by remote control on said monorail spur with said trolley to a tilting mechanism in said oil refinery;

tilting said fresh catalyst bin to a sufficient angle of inclination with said tilting mechanism while simultaneously and automatically unlocking the discharge side door near the bottom of said container with a power-driven socket to substantially empty said fresh catalyst from said bin into a fresh catalyst silo;

conveying said fresh catalyst with nitrogen gas from said silo to a surge hopper;

removing smaller particles of said fresh catalyst with a vibrating screen while passing larger fresh catalyst particles to a storage hopper;

fluidly conveying said larger fresh catalyst particles in a heavy vacuum gas oil slurry to a reactor train comprising a series of three ebullated bed reactors;

feeding a relatively high sulfur resid to said ebullated bed reactors;

injecting hydrogen into said ebullated bed reactors;

hydrotreating and ebullating said resid in said reactors in the presence of said fresh catalyst and hydrogen under hydrotreating conditions to produce an upgraded effluent product stream leaving spent catalyst;

separating said product stream into fractions of oil and gas in an atmospheric tower and a vacuum tower in said oil refinery;

conveying spent catalyst containing oil from said reactor to a spent catalyst inventory vessel with a middistillate slurry;

substantially deoiling said spent catalyst;

conveying said deoiled catalyst into the top of a spent catalyst bin while simultaneously weighing said spent catalyst bin on a scale;

stopping the flow of said deoiled catalyst into said bin upon reaching a desired weight;

lifting said spent catalyst bin to said monorail trolley on the underside of said overhead monorail with the grab hooks of said monorail transport carrier;

transporting said spent catalyst bin by remote control to said staging area with said trolley on said monorail;

releasing said spent catalyst bin from said monorail transport carrier and said trolley;

lifting said spent catalyst bin onto said flatbed truck with said bridge crane;

driving said flatbed truck carrying said spent catalyst bin from said oil refinery to a catalyst reclamation site away from said oil refinery;

removing said spent catalyst bin from said flatbed truck with the tines of a forklift truck at said reclamation site;

rotating the tines of said forklift truck to turn said spent catalyst bin upside-down at said reclamation site and substantially emptying said spent catalyst from said bin into a pile at a location spaced from said truck;

rotatably returning the tines of said forklift to their initial position to turn said bin right-side up;

positioning the empty spent catalyst bin on said flatbed truck with said forklift truck; and driving said flatbed truck carrying said empty spent catalyst bin to said oil refinery for receiving said deoiled spent catalyst.

8. A catalyst handling system for use in an oil refinery, comprising:

a fresh catalyst container having a top defining an inlet, a lid for snugly covering said top, a bottom, a side-door defining an outlet in proximity to said bottom, and hinge means including a bolt head for hingeably closing said side-door;

a spent catalyst container having a top defining a dual purpose opening for inflow and outflow of spent catalyst, said opening providing the only opening in said spent catalyst container;

a warehouse in an oil refinery providing a staging area for storing said containers;

fresh catalyst shipping means including a railroad car and a first flatbed truck for shipping said fresh catalyst container to said warehouse;

spent catalyst shipping means including a second flatbed truck for shipping said spent catalyst container from said oil refinery to a spent catalyst reclamation site away from said oil refinery;

a forklift truck having four rotatable tines for removing said spent catalyst container from said second flatbed truck, carrying said spent catalyst container to a disposal pile at said spent catalyst reclamation site, and turning said spent catalyst container upside-down with said four tines to substantially empty the spent catalyst from said container into said pile;

intelligence pads having upright posts for guiding, receiving and containing said containers and weight scales positioned adjacent said upright posts of said intelligence pads being located in said staging area, other of said intelligence pads being located at a spent catalyst bin-filling zone;

limit switches operatively connected to said intelligence pads in said staging area;

catalyst indicator pins extending from said fresh catalyst bins for cooperatively engaging and tripping said limit switches;

a bridge crane in said staging area for moving said fresh catalyst container from said first flatbed truck to one of said intelligence pads in said staging area and for moving said spent catalyst container from one of said intelligence pads in said staging area to said second flatbed truck;

a silo for containing said fresh catalyst;

a tilting mechanism located above said silo for tilting said fresh catalyst container, said tilting mechanism having a power-driven socket-arm for rotatably engaging said bolt head and unlocking said side-door to substantially empty said fresh catalyst from said container into said silo;

a surge hopper regulating the inventory of said fresh catalyst;

a transfer line extending between said silo and said surge hopper;

a nitrogen feed line communicating with said transfer line for injecting nitrogen gas into said transfer line to convey said fresh catalyst from said silo to said surge hopper;

a vibrating screen mechanism operatively associated with said surge hopper for removing smaller particles of fresh catalyst;

a storage hopper for storing larger particles of fresh catalyst;

a hopper transfer line extending between said vibrating screen mechanism and said storage hopper for passing said larger particles of fresh catalyst from said vibrating screen mechanism to said storage hopper;

at least one reactor train comprising a series of three ebullated bed reactors;

a slurry transfer line extending between said storage hopper and said reactor train;

a gas oil feed line for feeding a heavy vacuum gas oil slurry to said slurry transfer line to fluidly convey said fresh catalyst to said reactor train;

a resid feed line for feeding a relatively high sulfur resid to said reactor train;

hydrogen injectors for injecting a sufficient amount of hydrogen into said resid to hydroprocess said resid in said reactor train comprising said series of three ebullated bed reactors in the presence of said fresh catalyst to produce an upgraded effluent product stream leaving spent catalyst containing oil;

fractionation means comprising an atmospheric tower and a vacuum tower located downstream of said reactor train to separate said effluent product stream into fractions of oil and gas;

a deoiler unit for removing a substantial amount of oil from said spent catalyst, said deoiler unit including a discharge chute for directing the flow of spent catalyst into said spent catalyst container on one of said intelligence pads in said spent catalyst bin-filling zone;

remote controlled monorail transport means operatively positioned in said oil refinery, said remote controlled monorail transport means comprising a remote controlled trolley, an elevator for lifting said trolley, an overhead fresh catalyst monorail track extending between said staging area and said elevator, a monorail spur extending between said elevator and said tilting mechanism, an overhead spent catalyst monorail track extending between said spent catalyst bin-filling zone and said staging area, a retractable cable extending downwardly from said trolley, a monorail transport carrier connected to said cable, and remote controlled grab hooks operatively connected to said monorail transport carrier for grasping and carrying said fresh catalyst container on said fresh catalyst monorail track and spur from said intelligence pads in said staging area to said silo and for grasping and carrying said spent catalyst container on said spent catalyst monorail track from said intelligence pads in said spent catalyst bin-filling zone to said intelligence pads in said staging area; and a computer having a logic control unit operatively connected to said weigh scales, limit switches, grab hooks, and trolley for remotely controlling said grab hooks and trolley.

* * * * *